US012573572B2

(12) United States Patent     (10) Patent No.:   US 12,573,572 B2

Chen et al.     (45) Date of Patent:    Mar. 10, 2026

(54) BASE, CIRCUIT BREAKER WITH BASE, AND POWER DISTRIBUTION EQUIPMENT

(71) Applicant: HUAWEI DIGITAL POWER TECHNOLOGIES CO., LTD., Shenzhen (CN)

(72) Inventors: Peixing Chen, Dongguan (CN); Minxiang Zhang, Dongguan (CN); Xiangtao Meng, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 488 days.

(21) Appl. No.: 18/148,677

(22) Filed: Dec. 30, 2022

(65) Prior Publication Data

US 2023/0137749 A1    May 4, 2023

Related U.S. Application Data

(63) Continuation of application No. PCT/CN2020/099599, filed on Jun. 30, 2020.

(51) Int. Cl.
   *H01H 71/10*      (2006.01)
   *H01H 71/02*      (2006.01)
       (Continued)

(52) U.S. Cl.
   CPC .... *H01H 71/1009* (2013.01); *H01H 71/0207* (2013.01); *H02B 1/052* (2013.01);
       (Continued)

(58) Field of Classification Search
   CPC .... H01H 71/08; H01H 71/02; H01H 71/0228; H01H 71/0207; H01H 71/082;
       (Continued)

(56) References Cited

FOREIGN PATENT DOCUMENTS

CN      1751422 A    3/2006
CN    201408719 Y    2/2010
       (Continued)

OTHER PUBLICATIONS

International Search Report and Written Opinion in International Appln. No. PCT/CN2020/099599, mailed on Mar. 31, 2021, 17 pages (with English translation).

(Continued)

*Primary Examiner* — Ahmed M Saeed
(74) *Attorney, Agent, or Firm* — Fish & Richardson P.C.

(57) ABSTRACT

Example bases are described. One example base includes an insulating housing, where the insulating housing has a first surface and a second surface that are away from each other. The first surface is configured for a detachable connection of a circuit breaker. The second surface is provided with a first mounting slot. The insulation housing can be slidably snapped into a mounting rail in power distribution equipment by using the first mounting slot. An accommodating cavity is provided in the insulation housing. The accommodating cavity is configured to accommodate a conductive connection member. One end of the accommodating cavity is open along a sliding direction of the insulating housing relative to the mounting rail, and the other end thereof is closed. The base is used to install the circuit breaker.

20 Claims, 20 Drawing Sheets

(51) Int. Cl.
    *H02B 1/052*        (2006.01)
    *H01R 4/48*        (2006.01)

(52) U.S. Cl.
    CPC .......... *H01R 4/4821* (2023.08); *H01R 4/4833*
             (2023.08); *H01R 4/4835* (2023.08)

(58) Field of Classification Search
    CPC .......... H01H 71/0214; H01H 71/0271; H01H
          71/025; H02B 1/056; H02B 1/052; H02B
          1/205; H02B 1/04; H02B 1/24; H01R
          4/4821; H01R 4/4833; H01R 4/4835;
          H01R 13/502; H01R 25/142; H01R
          25/162; H01R 31/06; H01R 4/36; H01R
          4/4842; H01R 4/4846; H01R 9/2633;
                  H01R 9/2691
    See application file for complete search history.

(56)         References Cited

FOREIGN PATENT DOCUMENTS

| CN | 203339077 | U | 12/2013 | | |
|----|-----------|---|---------|---|---|
| CN | 103107485 | B | 1/2016 | | |
| CN | 205248216 | U | 5/2016 | | |
| CN | 106384700 | A | 2/2017 | | |
| CN | 106384921 | A | 2/2017 | | |
| CN | 206331983 | U | 7/2017 | | |
| CN | 107564776 | A | 1/2018 | | |
| CN | 107578956 | A | 1/2018 | | |
| CN | 208027997 | U | 10/2018 | | |
| CN | 209388978 | U | 9/2019 | | |
| DE | 3545930 | A1 | 6/1987 | | |
| FR | 2635233 | A1 * | 2/1990 | ............ | H02B 1/056 |
| JP | H1154388 | A | 2/1999 | | |
| WO | 2019174982 | A1 | 9/2019 | | |

OTHER PUBLICATIONS

Extended European Search Report in European Appln No. 20943422.
4, dated Jun. 21, 2023, 7 pages.

* cited by examiner

3

32

31

31

322

32

32

32

32

32

32

32

301

32

BASE, CIRCUIT BREAKER WITH BASE, AND POWER DISTRIBUTION EQUIPMENT

CROSS-REFERENCE TO RELATED APPLICATIONS

This application is a continuation of International Application No. PCT/CN2020/099599, filed on Jun. 30, 2020, the disclosure of which is hereby incorporated by reference in its entirety.

TECHNICAL FIELD

This application relates to the technical field of power distribution equipment, and in particular, to a base, a circuit breaker with a base, and power distribution equipment.

BACKGROUND

Circuit breakers, as line overload or short-circuit fault protection devices, are widely used in various circuits because they have the advantage of being recoverable and reusable in comparison with fuses.

To facilitate the unified management of circuit breakers of a plurality of circuits, the circuit breakers of the plurality of circuits are usually mounted together in one power distribution equipment, and are connected in series and arranged as one row by means of one rail, or connected in series and arranged as a plurality of rows by means of a plurality of parallel rails. For an upgrade of current specifications of these circuit breakers, not only the circuit breakers but also cables and terminals connected to the circuit breakers need to be replaced. Therefore, the upgrade of the circuit breakers is difficult and costly. To resolve this problem, a base compatible with circuit breakers of various current specifications may be mounted on the rail in the power distribution equipment. Cables and terminals connected to the base can transmit currents of various specifications, and the circuit breakers are detachably connected to the base. In this way, a circuit breaker can be upgraded simply by removing and replacing the circuit breaker from the base. Therefore, the upgrade operation of the circuit breaker is simple and easy to manage. However, at least one base is designed for each circuit breaker. As there are a large number of circuit breakers in the power distribution equipment, there are also a large number of corresponding bases, which greatly increases the costs.

SUMMARY

This application provides a base, a circuit breaker with a base, and power distribution equipment, which can reduce the costs of the base.

To achieve the foregoing objectives, the following technical solutions are used in embodiments of this application.

According to a first aspect, some embodiments of this application provide a base. The base includes an insulating housing. The insulating housing has a first surface and a second surface that are away from each other. The first surface is configured for a detachable connection of a circuit breaker. The second surface is provided with a first mounting slot. The insulating housing can be slidably snapped into a mounting rail in power distribution equipment by means of the first mounting slot. An accommodating cavity is provided in the insulating housing, and the accommodating cavity is configured to accommodate a conductive connection member. One end of the accommodating cavity is open along a sliding direction of the insulating housing relative to the mounting rail, and the other end thereof is closed.

When a plurality of bases provided in the embodiments of this application are mounted on the mounting rail, accommodating cavities of the plurality of bases are open toward the same direction, and in every two adjacent bases, a first wall plate of one base covers the opening of the accommodating cavity of the other base, thereby achieving the insulation isolation between conductive connection members of the two adjacent bases. Therefore, the insulating housing of the base does not need to be designed as an enclosed housing, and the material costs of the insulating housing as well as the costs of the base are relatively low. For power distribution equipment provided with a large number of bases, the costs can be significantly reduced.

Optionally, the insulating housing includes a bottom arm portion and two side arm portions. One end of each of the two side arm portions is connected to either end of the bottom arm portion along a first direction, and the other end of each of the two side arm portions extends toward the same side of the bottom arm portion along a second direction. The bottom arm portion and the two side arm portions enclose a second mounting slot, and the second mounting slot is configured for snap-fitting of the circuit breaker. The inner surface of the second mounting slot and the surfaces of the side arm portions away from the bottom arm portion constitute the first surface of the insulating housing, and the surface of the bottom arm portion away from the second mounting slot constitutes the second surface. The sliding direction of the insulating housing relative to the mounting rail, the first direction, and the second direction are perpendicular to each other. In this way, the circuit breaker can be detachably snapped into the second mounting slot through the opening at one end of the second mounting slot away from the bottom arm portion. The snapping operation of the circuit breaker is simple, and the assembly and disassembly efficiency are relatively high.

Optionally, the insulating housing is provided with a first connection port and a second connection port. Both the first connection port and the second connection port are in communication with the accommodating cavity. The first connection port is configured to allow the terminal of the circuit breaker to extend into the accommodating cavity when the circuit breaker is connected to the first surface. The second connection port allows the cable terminal to extend into the accommodating cavity. The base further includes a conductive connection member. The conductive connection member is provided in the accommodating cavity, and the conductive connection member includes a first conductive connection portion and a second conductive connection portion that are electrically connected. The first conductive connection portion is disposed close to the first connection port, and the first conductive connection portion is configured to be electrically connected to the terminal of the circuit breaker. The second conductive connection portion is disposed close to the second connection port, and the second conductive connection portion is configured to be electrically connected to the cable terminal. In this way, the electrical connection between the circuit breaker and the cable can be achieved.

Optionally, the first conductive connection portion is a U-shaped conductive elastic sheet, and a slot is formed between two elastic arms of the U-shaped conductive elastic sheet. The slot is configured for the plugging of the terminal of the circuit breaker when the circuit breaker is connected to the first surface. In this way, the electrical connection between the first conductive connection portion and the terminal of the circuit breaker is achieved by means of plugging, providing better stability of the electrical connection.

Optionally, the edge of one end of each of the elastic arms of the U-shaped conductive elastic sheet that surround the opening of the slot is provided with at least one notch, which extends toward a bottom wall of the slot to partition the elastic arm into a plurality of elastic arm units. The elastic arm unit includes an abutting portion, which is a portion that touches the terminal of the circuit breaker when the terminal of the circuit breaker is plugged into the slot. Distances between abutting portions of the plurality of elastic arm units and the bottom wall of the slot in the depth direction of the slot are different. In this way, the elastic arm is split into a plurality of elastic arm units having independent abutting portions, and time of contact between the abutting portions of the plurality of elastic arm units and the terminal of the circuit breaker during the plugging of the circuit breaker is different. During the plugging of the circuit breaker when the base is powered on, an electric arc is generated on an elastic arm unit that is first touched, thereby sacrificing electrical performance of the elastic arm unit. Therefore, the terminal of the circuit breaker can be effectively electrically connected to the remaining elastic arm units after being plugged into the slot. In this way, the elastic arms of the U-shaped conductive elastic sheet are prevented from being completely sacrificed due to the electric arc during the plugging of the terminal.

Optionally, the base further includes a U-shaped securing sleeve. The U-shaped securing sleeve is made of plastic or metal, and the U-shaped securing sleeve has elasticity. The U-shaped securing sleeve covers the U-shaped conductive elastic sheet to secure the relative positions of the plurality of elastic arm units of the U-shaped conductive elastic sheet, and increase an elastic clamping force between the two elastic arms of the U-shaped conductive elastic sheet, so that the U-shaped conductive elastic sheet can be in effective contact with and electrically connected to the terminal of the circuit breaker.

Optionally, a cable terminal plug-in slot is provided at a position close to the second connection port in the accommodating cavity, and the opening of the cable terminal plug-in slot is opposite the second connection port. The second conductive connection portion constitutes one side wall of the cable terminal plug-in slot. The base further includes an elastic member. The elastic member constitutes the other side wall of the cable terminal plug-in slot opposite the second conductive connection portion. The elastic member is configured to apply an elastic pressing force toward the second conductive connection portion to the cable terminal when the cable terminal is plugged into the cable terminal plug-in slot through the second connection port, so as to crimp the cable terminal onto the second conductive connection portion. In this way, the secured relative position of and the electrical connection to the second conductive connection portion can be achieved immediately when the cable terminal is plugged into the cable terminal plug-in slot. This connection method is convenient to operate and has high efficiency. In addition, the design of the elastic force of the elastic member can ensure the stability of the connection between the cable terminal and the second conductive connection portion, preventing the cable terminal from falling off.

Optionally, the elastic member is an elastic sheet. The elastic sheet includes a fixed portion and an elastic arm portion. The fixed portion is fixed relative to the insulating housing. One end of the elastic arm portion is connected to the fixed portion, and the other end of the elastic arm portion extends toward the second conductive connection portion and inclines toward the direction away from the second connection port. The elastic arm portion constitutes the other side wall of the cable terminal plug-in slot opposite the second conductive connection portion. In this way, during the plugging of the cable terminal into the cable terminal plug-in slot through the second connection port, the head of the cable terminal presses the elastic arm portion, so that the elastic arm portion is bent and deformed to accumulate an elastic force, which is directed to the second conductive connection portion. When the bending deformation produced by the elastic arm portion reaches a specific level, the accumulated elastic force can crimp the cable terminal onto the second conductive connection portion, so as to achieve the secured relative position and the electrical connection between the cable terminal and the second conductive connection portion. This structure is simple and easy to implement.

Optionally, the base further includes an unlocking device. The unlocking device is configured to drive the elastic arm portion to move away from the second conductive connection portion, so as to release the elastic pressing force applied to the cable terminal. In this way, when an error occurs during the installation of the cable and the base or in the later maintenance process of the base, the elastic arm portion may be driven by the unlocking device to move away from the second conductive connection portion, so as to release the elastic pressing force applied to the cable terminal, and the cable terminal is unplugged from the cable terminal plug-in slot to implement the removal of the cable terminal from the base.

Optionally, the unlocking device is a pull cord connected to the elastic arm portion, and the elastic arm portion can be pulled with the pull cord to move away from the second conductive connection portion.

Optionally, the elastic sheet further includes a connection portion, and one end of the elastic arm portion is connected to the fixed portion by means of the connection portion. The unlocking device includes a push rod and a first locking structure. A slide hole is provided at a position opposite the connection portion on the wall plate of the insulating housing in which the second connection port is located. The push rod slides through slide hole, and can slide to a first position in the direction toward the connection portion, to press the connection portion to bend in the direction away from the slide hole and drive the elastic arm portion to move away from the second conductive connection portion, so as to release the elastic pressing force applied to the cable terminal. The first locking structure is configured to secure a relative position between the push rod and the slide hole in the axial direction of the slide hole after the push rod slides to the first position. This structure of the unlocking device is simple and easy to implement.

Optionally, the first locking structure includes a first slider and a first slide groove. The first slider is provided on a side wall of the push rod. The first slide groove is provided on an inner wall of the slide hole. The first slide groove includes a first slide groove section and a second slide groove section. The first slide groove section extends along the axial direction of the slide hole, the second slide groove section extends along the circumferential direction of the slide hole, and one end of the second slide groove section is connected to one end of the first slide groove section close to the connection portion. The first slider is slidably connected in the first slide groove, and the first slider slides in the first slide groove section during the sliding of the push rod to the first position. When the push rod slides to the first position, the first slider slides to the end of the first slide groove section close to the connection portion. After the push rod slides to the first position, the first slider can slide from the first slide groove section into the second slide groove section. In this way, after the push rod slides to the first position, the push rod may be rotated, and the first slider may be driven to slide from the first slide groove section into the second slide groove section, thereby securing the relative position between the push rod and the slide hole in the axial direction of the slide hole and keeping the push rod in the first position. This structure is simple and easy to implement.

Optionally, one end of the push rod away from the connection portion is outside the insulating housing, and a stopper protrusion is provided on a side wall of the end of the push rod away from the connection portion. The stopper protrusion is spaced from the insulating housing. When the push rod slides to the first position in the direction toward the connection portion, the stopper protrusion abuts against an outer surface of the insulating housing. In this way, the stopper protrusion can prevent the push rod from falling into the inner space of the insulating housing through the slide hole. This structure is simple and easy to implement.

Optionally, the base further includes a cover plate and a second locking structure. One end of the cover plate is rotatably connected to the end of the side arm portion away from the bottom arm portion. An axis of rotation of the cover plate is parallel to the sliding direction of the insulating housing relative to the mounting rail. The cover plate can be rotated from a second position to a third position in the direction toward the second mounting slot. When the cover plate is in the second position, the cover plate does not cover the opening of the second mounting slot. When the cover plate is in the third position, the cover plate covers the opening of the second mounting slot. The second locking structure is provided between the cover plate and the side arm portion. The second locking structure is configured to secure a relative position between the cover plate and the side arm portion when the cover plate is rotated to the third position. In this way, the cover plate can prevent the circuit breaker from falling out of the second mounting slot, so that the mounting stability of the circuit breaker on the base can be improved.

Optionally, the second locking structure includes an elastic snapping arm and a snapping notch. The elastic snapping arm is provided on the cover plate, and the elastic snapping arm extends along the sliding direction of the insulating housing relative to the mounting rail. The snapping notch is provided on the side arm portion, and the opening of the snapping notch faces the second mounting slot. When the cover plate is rotated to the third position, the elastic snapping arm is snapped into the snapping notch. This structure is simple and easy to implement. In addition, when an acting force applied to the cover plate can overcome an elastic snapping force between the elastic snapping arm and the snapping notch, the cover plate can be driven to return to the second position to expose the opening of the second mounting slot. At this time, the circuit breaker can be replaced or mounted.

Optionally, the base further includes a third locking structure. The third locking structure is configured to secure a relative position between the elastic snapping arm and the snapping notch when the cover plate is rotated to the third position. In this way, the cover plate is double-locked, so that the cover plate can effectively prevent the circuit breaker from falling out of the second mounting slot.

6

Optionally, the third locking structure includes a second slide groove, a second slider, a stopper buckle, and a stopper slot. The second slide groove is provided on the cover plate, and the second slide groove extends along a direction that is parallel to the cover plate and that is perpendicular to the axis of rotation of the cover plate. The second slider is slidably connected in the second slide groove, and the second slider can slide from a fourth position to a fifth position along the second slide groove in the direction toward the axis of rotation of the cover plate. The stopper buckle is provided on the second slider, and the stopper slot is provided on a bottom surface of the second slide groove. When the second slider slides from the fourth position to the fifth position, the second slider drives the stopper buckle to be slidably snapped into the stopper slot, and makes the stopper buckle abut against a surface of the elastic snapping arm away from the axis of rotation of the cover plate. In this way, the elastic snapping arm can be locked in the snapping notch to secure the relative position between the elastic snapping arm and the snapping notch. This structure is simple and easy to implement. In addition, when an acting force applied to the second slider can overcome an elastic snapping force between the stopper buckle and the stopper slot, the second slider can be driven to return to the fourth position to unlock the elastic snapping arm, so that the elastic snapping arm can slide out of the snapping notch under the action of an external force.

Optionally, the second slide groove includes a third slide groove section and a fourth slide groove section, and the fourth slide groove section is located on the side of the third slide groove section away from the axis of rotation of the cover plate. When the second slider is in the fourth position, the second slider is located in the fourth slide groove section, and is not located in the third slide groove section. When the second slider is in the fifth position, the second slider is located in the third slide groove section, and is not located in the fourth slide groove section. A bottom surface of the third slide groove section is provided with a first sign, and a bottom surface of the fourth slide groove section is provided with a second sign. The first sign is different from the second sign. Therefore, it can be determined from the first sign and the second sign that the elastic snapping arm is in the unlocked state or the locked state.

Optionally, the base further includes a temperature measurement module and a fourth locking structure. The temperature measurement module is provided in the accommodating cavity. The temperature measurement module includes a temperature sensor and a wiring socket. The temperature sensor is disposed on the conductive connection member. The temperature sensor is electrically connected to the wiring socket. The insulating housing is further provided with a third connection port, which is in communication with the accommodating cavity. The wiring socket is disposed close to the third connection port, and the third connection port allows the wiring plug to extend into the accommodating cavity so as to be plugged into the wiring socket. The fourth locking structure is provided on the outer surface of the insulating housing, and the fourth locking structure is configured to secure a relative position between the wiring plug and the wiring socket after the wiring plug is plugged into the wiring socket through the third connection port. In this way, the relative position between the wiring plug and the wiring socket can be secured by the fourth locking structure to prevent the wiring plug from falling out of the wiring socket.

Optionally, a boss is provided around a side wall of the wiring plug. During the plugging of the wiring plug into the wiring socket through the third connection port, the boss extends into the third connection port along with the wiring plug. The fourth locking structure includes a slide rail, a third slider, a stopper, a first elastic buckle, and a first elastic slot. The slide rail is provided on the outer surface of the insulating housing, and the slide rail extends toward the third connection port. The third slider is slidably connected to the slide rail. The stopper is provided at one end of the third slider close to the third connection port. The third slider can slide from a sixth position to a seventh position along the slide rail in the direction toward the third connection port, so as to drive the stopper to move from a position not covering the third connection port to a position covering the third connection port. One of the first elastic buckle and the first elastic slot is provided on the slide rail, and the other of the first elastic buckle and the first elastic slot is provided on the third slider. When the third slider slides to the seventh position, the first elastic buckle is snapped into the first elastic slot. Therefore, the boss can be stopped by the stopper to lock the wiring plug and prevent the wiring plug from falling out of the wiring socket. This structure is simple and easy to implement.

Optionally, the slide rail includes a first slide rail section and a second slide rail section, and the second slide rail section is located on the side of the first slide rail section away from the third connection port. When the third slider is in the sixth position, the third slider is located on the second slide rail section and is not located on the first slide rail section. When the third slider is in the seventh position, the third slider is located on the first slide rail section and is not located on the second slide rail section. The first slide rail section is provided with a third sign, and the second slide rail section is provided with a fourth sign. The third sign is different from the fourth sign. Therefore, it can be determined from the third sign and the fourth sign that the wiring plug is in the unlocked state or the locked state.

Optionally, a first claw and a second claw are provided on a surface of the bottom arm portion away from the second mounting slot, and the first claw and the second claw constitute two opposite side walls of the first mounting slot. The second claw is fixed relative to the bottom arm portion, and the first claw can move from an eighth position to a ninth position in the direction toward the second claw, to drive the first claw and the second claw to be snapped onto the mounting rail in the power distribution equipment. The base further includes a fifth locking structure. The fifth locking structure is provided between the first claw and the bottom arm portion. The fifth locking structure is configured to secure a relative position between the first claw between the bottom arm portion when the first claw moves to the ninth position. In this way, after the first claw and the second claw are slidably snapped onto the mounting rail in the power distribution equipment, the insulating housing can be prevented from falling off the mounting rail due to displacement of the first claw.

Optionally, the fifth locking structure includes a second elastic buckle and a second elastic slot. One of the second elastic buckle and the second elastic slot is provided on the first claw, and the other of the second elastic buckle and the second elastic slot is provided on the bottom arm portion. When the first claw moves to the ninth position, the second elastic buckle is snapped into the second elastic slot. When an acting force applied to the first claw can overcome an elastic snapping force between the second elastic buckle and the second elastic slot, the first claw can be driven to return to the eighth position. This structure is simple and easy to implement.

Optionally, a lifting slot is provided on a surface of the first claw facing the bottom arm portion. An operation hole is provided at a position on the bottom arm portion corresponding to the lifting slot. The operation hole extends through the bottom arm portion along the second direction. The operation hole allows the lifting lever to extend into the lifting slot to drive the first claw to move to the eighth position or the ninth position. In this way, the operator can drive the first claw to move to the eighth position or the ninth position from the front side of the base. This operation is convenient and easy to implement.

According to a second aspect, some embodiments of this application provide a circuit breaker with a base. The circuit breaker with a base includes a circuit breaker and a base. The base is the base described in any one of the foregoing technical solutions, and the circuit breaker is detachably connected to the first surface of the insulating housing of the base.

Because the base used in the circuit breaker with a base in the embodiments of this application is the same as the base described in any one of the foregoing technical solutions, they can resolve the same technical problem and achieve the same desired effect.

According to a third aspect, some embodiments of this application provide power distribution equipment. The power distribution equipment includes a mounting rail and a plurality of circuit breakers with bases. The circuit breaker with a base is the circuit breaker with a base described in the foregoing technical solution, and the base of the circuit breaker with a base can be slidably snapped onto the mounting rail by means of the first mounting slot.

Because the circuit breaker with a base used in the power distribution equipment in the embodiments of this application is the same as the circuit breaker with a base described in the foregoing technical solution, they can resolve the same technical problem and achieve the same desired effect.

BRIEF DESCRIPTION OF DRAWINGS

FIG. 24b is a schematic diagram of a structure of a surface on which a fourth locking structure is located in the base shown in FIG. 24a;

FIG. 25b is a partial enlarged view of a region II in the base shown in FIG. 25a;

DESCRIPTION OF EMBODIMENTS

Figure 1:
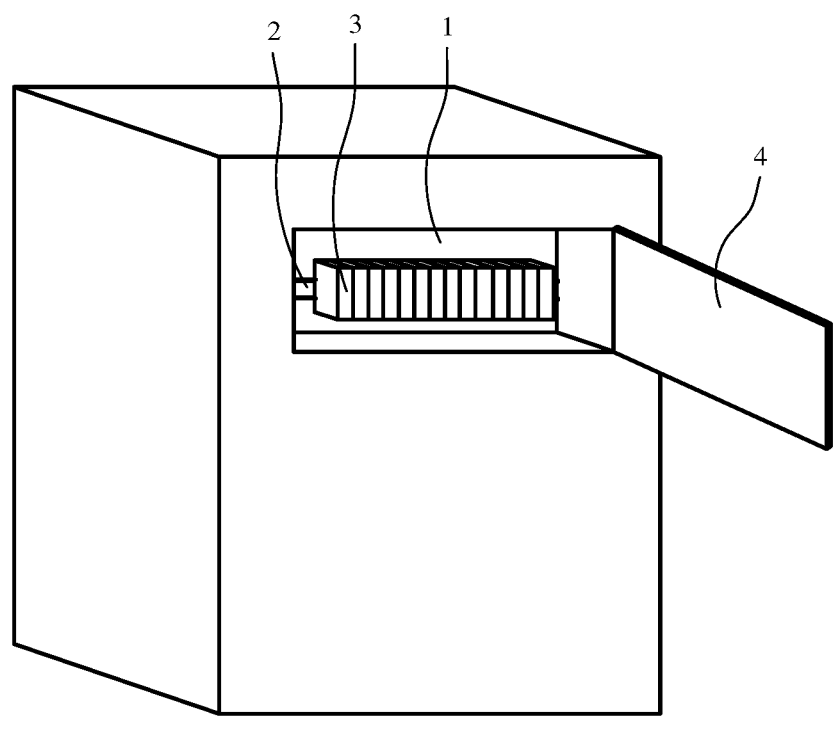
FIG. 1 is a schematic diagram of a structure of power distribution equipment according to some embodiments of this application.

The following describes the technical solutions in embodiments of this application with reference to the accompanying drawings in embodiments of this application. It is clear that the described embodiments are merely a part rather than all of embodiments of this application.

The terms "first", "second", "third", "fourth", "fifth", "sixth", "seventh", and "eighth" in the embodiments of this application are merely used for descriptive purposes, and should not be construed as indicating or implying the relative importance or implicitly indicating the number of technical features indicated. Therefore, the features defined with "first", "second", "third", "fourth", "fifth", "sixth", "seventh", and "eighth" may explicitly or implicitly include one or more features.

In descriptions of embodiments of this application, the term "and/or" describes an association relationship between associated objects and indicates that three relationships may exist. For example, A and/or B may indicate the following three cases: Only A exists, both A and B exist, and only B exists. In addition, the character "/" in this specification generally indicates an "or" relationship between the associated objects.

This application relates to a base, a circuit breaker with a base, and power distribution equipment. The concepts involved in this application are briefly described below.

Miniature circuit breaker (MCB): one of the most widely used terminal protection electrical devices in building electrical terminal power distribution equipment. The miniature circuit breaker is used for single-phase or three-phase short-circuit, overload, overvoltage, and other protection with a current below 125 A. A miniature circuit breaker is of four types, namely, single-pole (1P), two-pole (2P), three-pole (3P), and four-pole (4P).

Copper bar: also referred to as a copper busbar or a copper bus bar, which is an elongated conductor made of copper material and having a rectangular cross-section or a rectangular cross-section with chamfered or rounded corners. To avoid point discharge, a copper bar having a rectangular cross-section with rounded corners is usually used. The copper bar plays the role of transmitting a current and connecting electrical equipment in a circuit.

Negative temperature coefficient (NTC) thermistor: a thermistor with a resistance value decreasing rapidly as temperature increases. The NTC thermistor is manufactured by ceramic technology using oxides of metals such as manganese, cobalt, nickel, and copper as main materials.

A base of a circuit breaker typically includes an enclosed insulating housing and a conductive connection member. The circuit breaker is mounted on the insulating housing. The conductive connection member is provided in the insulating housing. One end of the conductive connection member is electrically connected to a terminal of the circuit breaker, and the other end of the conductive connection member is electrically connected to a cable terminal, with the cable terminal connected to a cable, so as to connect the circuit breaker to the cable. When bases of a plurality of circuit breakers are connected in series on a rail in power distribution equipment, two adjacent bases are next to each other, and conductive connection members of the two adjacent bases are separated by insulating housings of the two adjacent bases. However, in fact, the insulation isolation between the conductive connection members of the two adjacent bases can be achieved simply by separating the conductive connection members of the two bases by the insulating housing of one base. Therefore, material used for the insulating housing of the base is redundant, resulting in a waste of resources.

To avoid the above problem, this application provides power distribution equipment, which includes, but is not limited to, a high-voltage power distribution cabinet, a low-voltage switch cabinet, a switch box, a control box, and the like.

FIG. 1 is a schematic diagram of a structure of power distribution equipment according to some embodiments of this application. As shown in FIG. 1, the power distribution equipment includes a circuit breaker accommodating cavity 1, and the circuit breaker accommodating cavity 1 is provided with a mounting rail 2 and a plurality of circuit breakers 3 with bases. The plurality of circuit breakers 3 with bases are slidably snapped onto the mounting rail 2 by means of the bases 32, respectively, to connect the plurality of circuit breakers 3 with bases in series as a row by means of the mounting rail 2, thereby facilitating the management of the circuit breakers. One end of the accommodating cavity 1 is open, and the opening of the accommodating cavity 1 is provided with a cover 4. The cover 4 is used for the opening or closing of the accommodating cavity 1, so as to facilitate an operator to open, close, and maintain the circuit breakers.

This application further provides a circuit breaker with a base, which is the circuit breaker with a base in the above-mentioned power distribution equipment. The circuit breaker with a base includes a circuit breaker and a base. Optionally, the circuit breaker is a miniature circuit breaker. The circuit breaker may be a single-pole circuit breaker, a two-pole circuit breaker, a three-pole circuit breaker, or a four-pole circuit breaker, which is not specifically limited herein. The circuit breaker is mounted on the base. The base is mounted on the mounting rail in the power distribution equipment, and can slide along the mounting rail to adjust the position of the circuit breaker with a base.

The number of bases in the circuit breaker with a base may be one, two, three, or four, which is not specifically limited herein. The circuit breaker may be a single-pole circuit breaker, a two-pole circuit breaker, a three-pole circuit breaker, or a four-pole circuit breaker. A width of the two-pole circuit breaker in an extension direction of the mounting rail is usually twice that of the single-pole circuit breaker in the extension direction of the mounting rail. A width of the three-pole circuit breaker in the extension direction of the mounting rail is usually three times that of the single-pole circuit breaker in the extension direction of the mounting rail. A width of the four-pole circuit breaker in the extension direction of the mounting rail is usually four times that of the single-pole circuit breaker in the extension direction of the mounting rail. Therefore, to improve the adaptability of the base, the base may be a base that matches the single-pole circuit breaker. In this way, if the circuit breaker is a two-pole circuit breaker, two bases arranged side by side may be used to mount the two-pole circuit breaker; if the circuit breaker is a three-pole circuit breaker, three bases arranged side by side may be used to mount the three-pole circuit breaker; and if the circuit breaker is a four-pole circuit breaker, four bases arranged side by side may be used to mount the four-pole circuit breaker.

Figure 2:
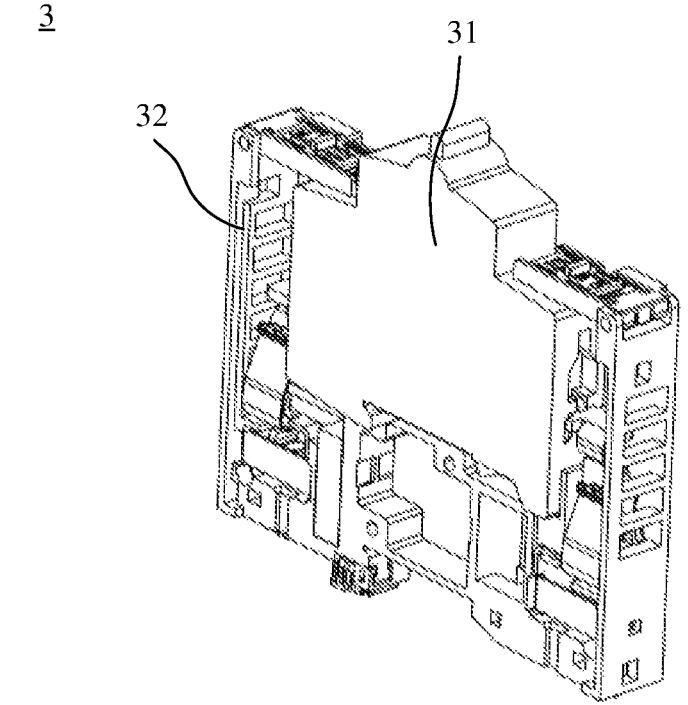
FIG. 2 is a schematic diagram of a structure of a circuit breaker with a base according to some embodiments of this application.
Figure 3:
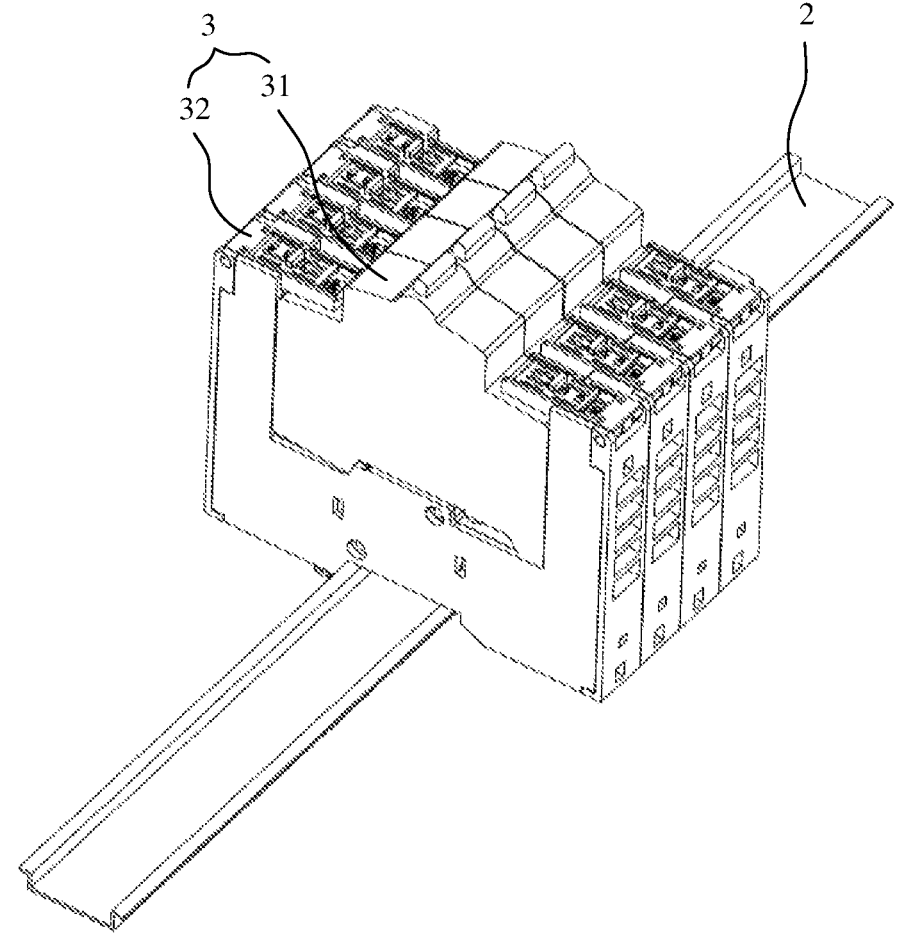
FIG. 3 is a schematic diagram of a structure of a plurality of circuit breakers with bases shown in FIG. 2 being mounted on a mounting rail.

FIG. 2 is a schematic diagram of a structure of a circuit breaker with a base according to some embodiments of this application. As shown in FIG. 2, the circuit breaker with a base includes a circuit breaker 31 and a base 32. The circuit breaker 31 is a single-pole miniature circuit breaker. The base 32 is adapted to a single-pole circuit breaker. The circuit breaker 31 is mounted on the base 32. The base 32 is mounted on the mounting rail in the power distribution equipment. FIG. 3 is a schematic diagram of a structure of a plurality of circuit breakers with bases shown in FIG. 2 being mounted on a mounting rail. As shown in FIG. 3, the plurality of circuit breakers 3 with bases can slide along the mounting rail 2 to adjust the positions of the plurality of circuit breakers 3 with bases.

Figure 4:
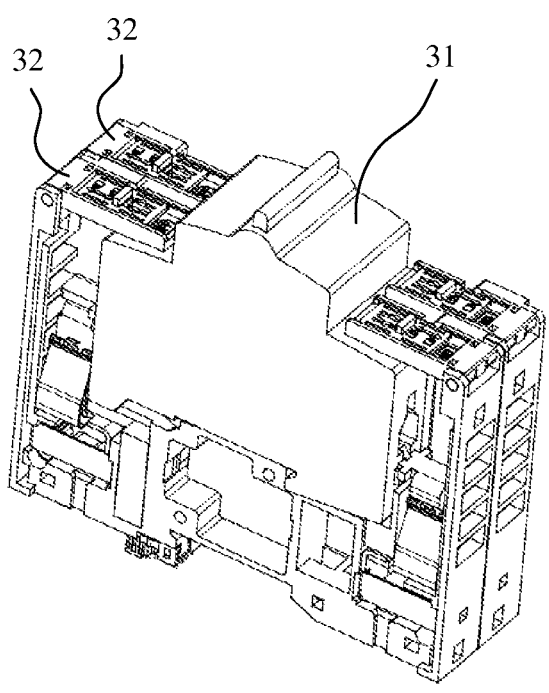
FIG. 4 is a schematic diagram of a structure of a circuit breaker with a base according to some other embodiments of this application.

FIG. 4 is a schematic diagram of a structure of a circuit breaker with a base according to some other embodiments of this application. As shown in FIG. 4, the circuit breaker with a base includes a circuit breaker 31 and a base 32. The circuit breaker 31 is a two-pole miniature circuit breaker, and there are two bases 32, each of which is adapted to a single-pole circuit breaker. The two bases 32 are arranged side by side, and the circuit breaker 31 is mounted on the two bases 32 arranged side by side. The two bases 32 are mounted on the mounting rail 2 in the power distribution equipment, and can slide along the mounting rail 2 to adjust the position of the circuit breaker 3 with a base.

Figure 5:
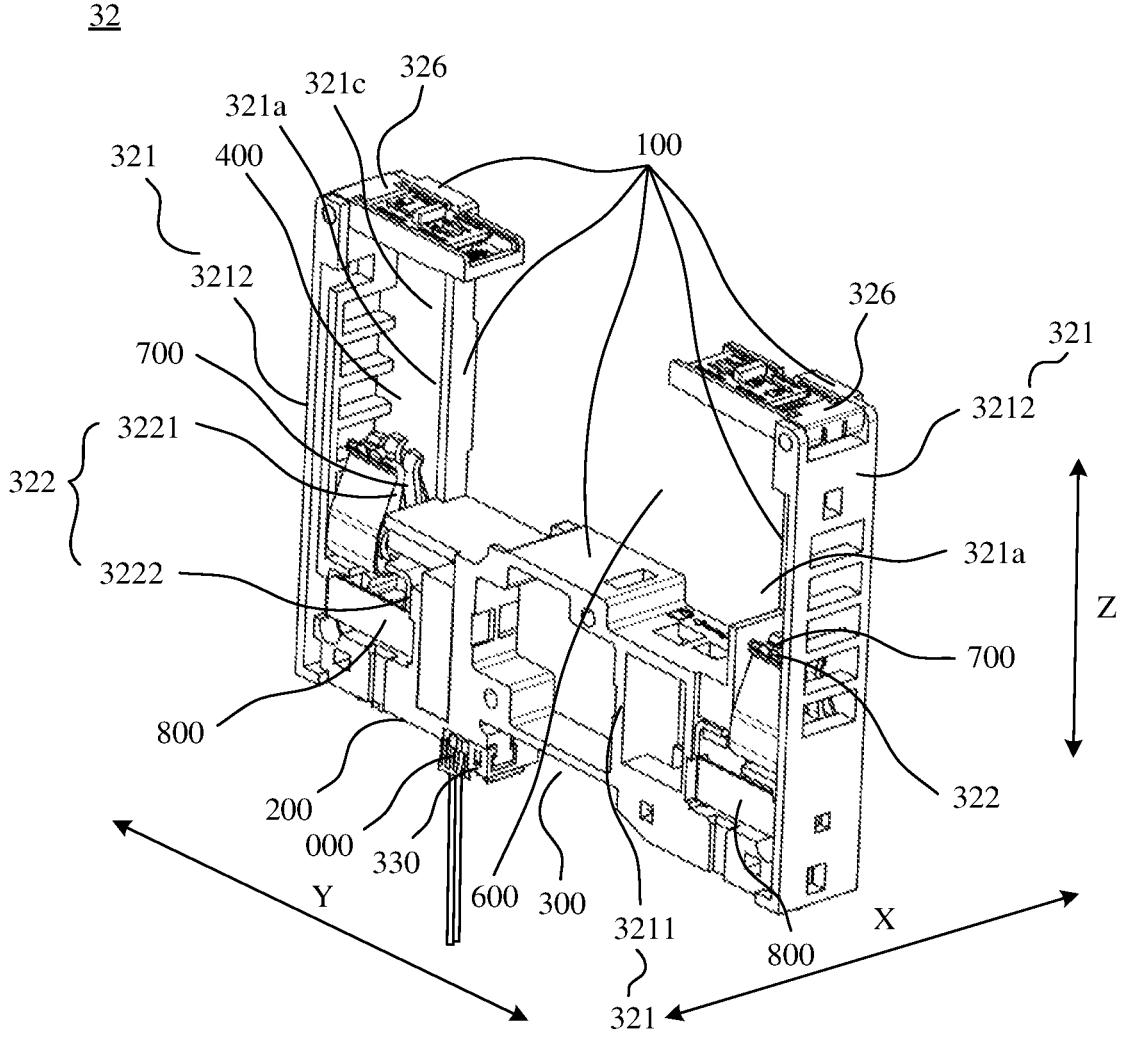
FIG. 5 is a schematic diagram of a structure of a base in a first orientation according to some embodiments of this application.

This application further provides a base, which is the base in the above-mentioned circuit breaker with a base. FIG. 5 is a schematic diagram of a structure of a base in a first orientation according to some embodiments of this application. The base is the base 32 in the circuit breaker with a base shown in FIG. 2 or FIG. 4.

As shown in FIG. 5, the base 32 includes an insulating housing 321. The insulating housing 321 is made of an insulating material such as plastic or ceramic.

The insulating housing 321 has a first surface 100 and a second surface 200 that are away from each other. The first surface 100 may be a flat surface or a curved surface. The first surface 100 is configured for a detachable connection of the circuit breaker 31. The second surface 200 may be a flat surface or a curved surface. The second surface 200 is provided with a first mounting slot 300. The insulating housing 321 can be slidably snapped onto the mounting rail 2 in the power distribution equipment by means of the first mounting slot 300.

As shown in FIG. 5, an accommodating cavity 400 is formed in the insulating housing 321, and the accommodating cavity 400 is configured to accommodate a conductive connection member 322. One end of the accommodating cavity 400 is open along a sliding direction of the insulating housing 321 relative to the mounting rail 2 (that is, a direction X shown in FIG. 5), and the other end thereof is closed by a first wall plate 321c of the insulating housing 321.

Figure 6:
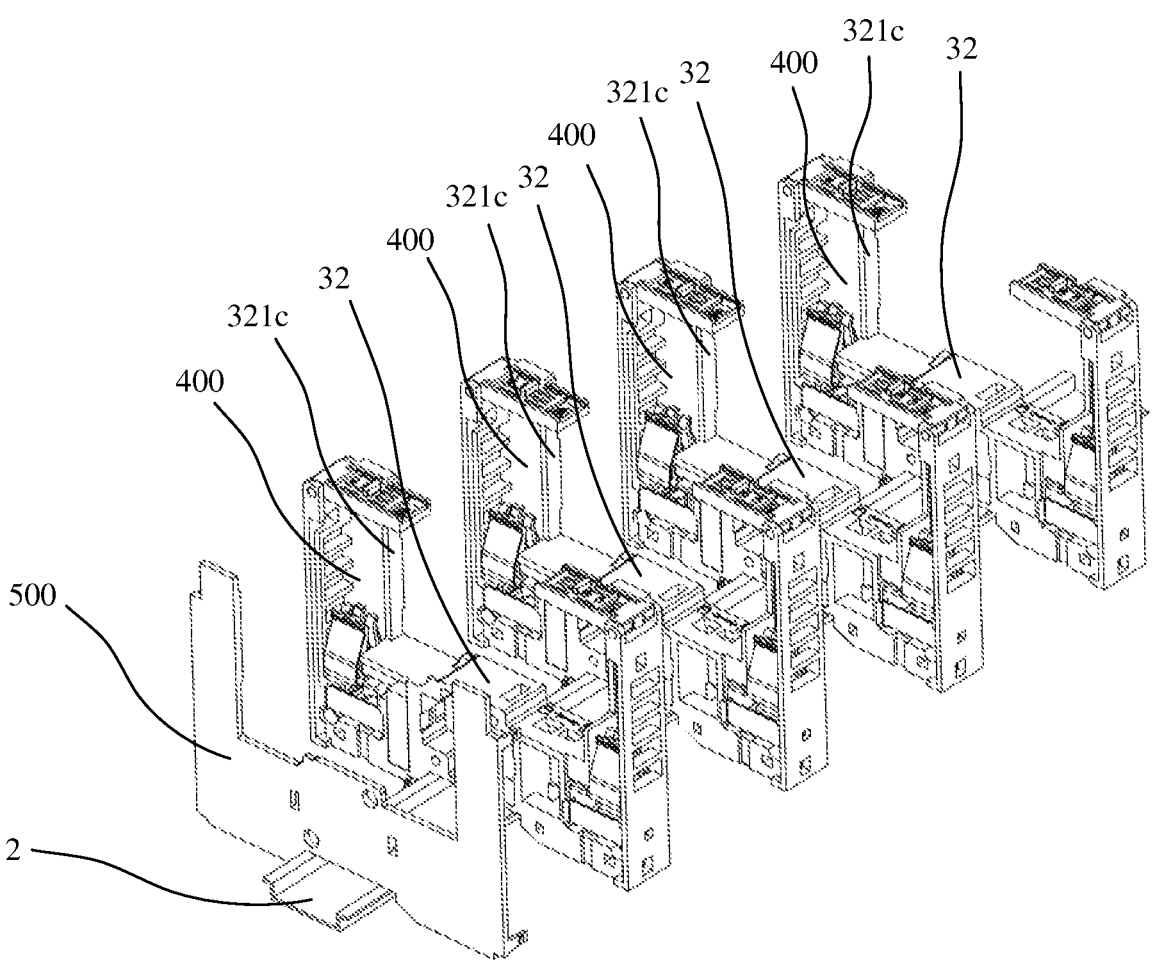
FIG. 6 is a schematic diagram of a structure of a plurality of bases shown in FIG. 5 being mounted on a mounting rail, with two adjacent bases spaced apart for a specific distance.

In this way, when a plurality of bases 32 are mounted on the mounting rail 2, FIG. 6 is a schematic diagram of a structure of a plurality of bases shown in FIG. 5 being mounted on a mounting rail, with two adjacent bases spaced apart for a specific distance. In actual use, the plurality of bases are attached together in sequence. As shown in FIG. 6, accommodating cavities 400 of the plurality of bases 32 are open toward the same direction, and in every two adjacent bases 32, a first wall plate 321c of one base 32 covers the opening of the accommodating cavity 400 of the other base 32, thereby achieving the insulation isolation between conductive connection members 322 of the two adjacent bases 32. Therefore, the insulating housing 321 of the base 32 does not need to be designed as an enclosed housing, and the material costs of the insulating housing 321 as well as the costs of the base 32 are relatively low. For power distribution equipment provided with a large number of bases, the costs can be significantly reduced.

In the foregoing embodiment, to protect a conductive connection member 322 in the base 32 at the end, as shown in FIG. 6, a cover plate 500 is provided at the opening of an accommodating cavity 400 of the base 32 at the end. The cover plate 500 can cover the opening of the accommodating cavity 400 of the base 32 at the end.

The first surface 100 may be detachably connected to the circuit breaker 31 by means of snap-fit, threaded connection, magnetic attraction, or the like, which is not specifically limited herein.

In some embodiments, as shown in FIG. 5, the insulating housing 321 includes a bottom arm portion 3211 and two side arm portions 3212. One end of each of the two side arm portions 3212 is connected to either end of the bottom arm portion 3211 along a first direction (that is, a direction Y shown in FIG. 5), and the other end of each of the two side arm portions 3212 extends toward the same side of the bottom arm portion 3211 along a second direction (that is, a direction Z shown in FIG. 5).

As shown in FIG. 5, the bottom arm portion 3211 and the two side arm portions 3212 enclose a second mounting slot 600, and the second mounting slot 600 is configured for snap-fitting of the circuit breaker 31. The inner surface of the second mounting slot 600 and the surfaces of the side arm portions 3212 away from the bottom arm portion 3211 constitute the first surface 100, and the surface of the bottom arm portion 3211 away from the second mounting slot 600 constitutes the second surface 200.

The sliding direction of the insulating housing 321 relative to the mounting rail 2, the first direction, and the second direction are perpendicular to each other.

In this way, the circuit breaker 31 can be detachably snapped into the second mounting slot 600 through the opening at one end of the second mounting slot 600 away from the bottom arm portion 3211. The snapping operation of the circuit breaker 31 is simple, and the assembly and disassembly efficiency are relatively high.

The base 32 is configured to achieve an electrical connection between the circuit breaker 31 and a cable. To achieve this purpose, as shown in FIG. 5, the base 32 further includes the conductive connection member 322. The conductive connection member 322 is provided in the accommodating cavity 400, and the conductive connection member 322 is configured to conductively connect a terminal of the circuit breaker 31 and a cable terminal.

Figure 7:
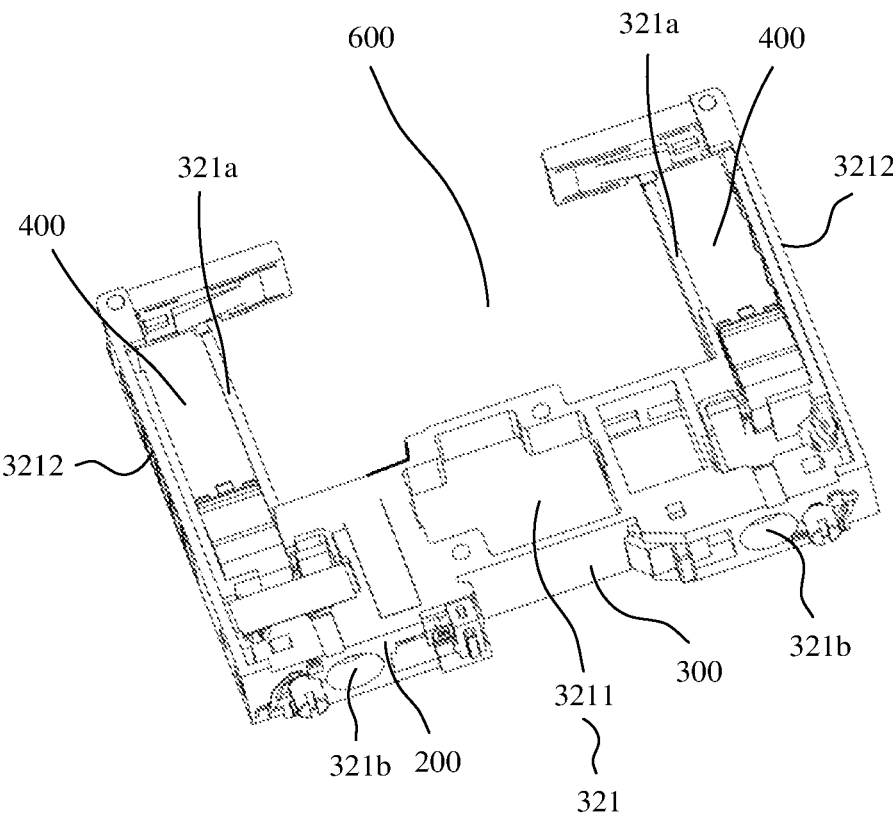
FIG. 7 is a schematic diagram of a structure of the base shown in FIG. 5 in a second orientation.

Specifically, as shown in FIG. 5, the insulating housing 321 is provided with a first connection port 321a. FIG. 7 is a schematic diagram of a structure of the base shown in FIG. 5 in a second orientation. As shown in FIG. 7, the insulating housing 321 is further provided with a second connection port 321b. Both the first connection port 321a and the second connection port 321b are in communication with the accommodating cavity 400. The first connection port 321a is configured to allow the terminal of the circuit breaker 31 to extend into the accommodating cavity 400 when the circuit breaker 31 is connected to the first surface 100. The second connection port 321b allows the cable terminal to extend into the accommodating cavity 400.

The conductive connection member 322 includes a first conductive connection portion 3221 and a second conductive connection portion 3222 that are electrically connected. Both the first conductive connection portion 3221 and the second conductive connection portion 3222 are made of copper or copper alloy. The first conductive connection portion 3221 is disposed close to the first connection port 321a, and the first conductive connection portion 3221 is configured to be electrically connected to the terminal of the circuit breaker 31. The second conductive connection portion 3222 is disposed close to the second connection port 321b, and the second conductive connection portion 3222 is configured to be electrically connected to the cable terminal, which is connected to the cable.

The electrical connection between the first conductive connection portion 3221 and the terminal of the circuit breaker 31 may be a plug-in electrical connection, an abutting electrical connection, or the like, which is not specifically limited herein.

Figure 8:
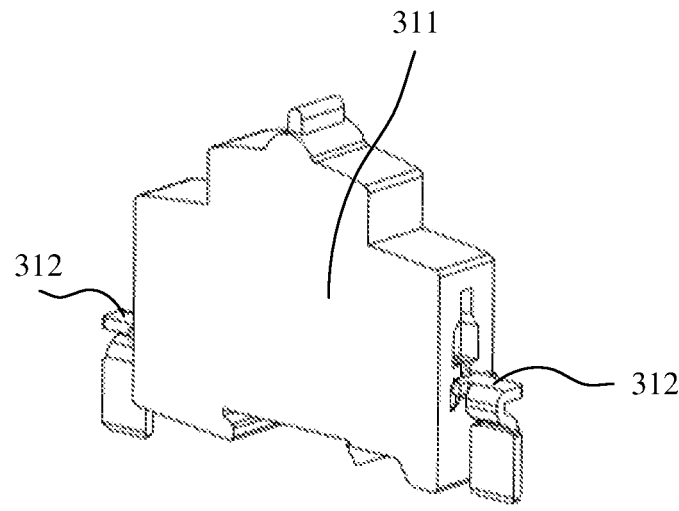
FIG. 8 is a schematic diagram of a structure of a circuit breaker in the circuit breaker with a base according to some embodiments of this application.

FIG. 8 is a schematic diagram of a structure of a circuit breaker in the circuit breaker with a base according to some embodiments of this application. The circuit breaker is the circuit breaker 31 in the circuit breaker with a base shown in FIG. 2 or FIG. 4. As shown in FIG. 8, the circuit breaker 31 includes a circuit breaker body 311 and a terminal 312. The terminal 312 is an adapting terminal connected to a terminal block of the circuit breaker body 311. The terminal 312 may be a copper bar or another metal conductor structure. In some embodiments, as shown in FIG. 8, the terminal 312 is a copper bar.

Figure 9:
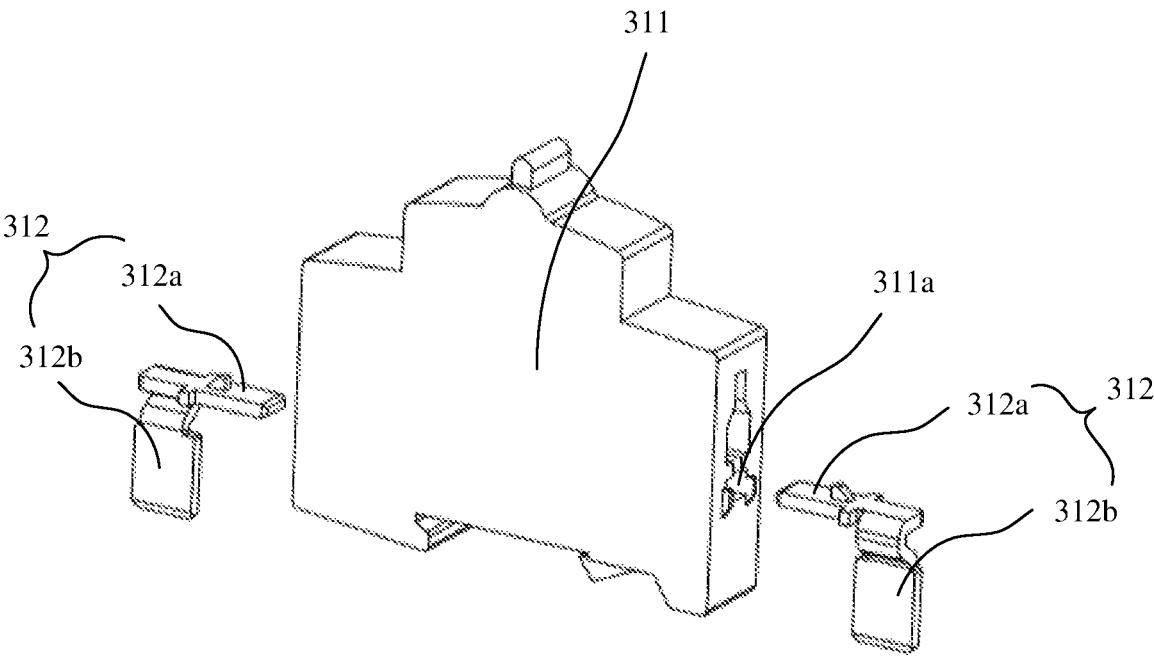
FIG. 9 is an exploded view of the circuit breaker in the circuit breaker with a base shown in FIG. 8.
Figure 10:
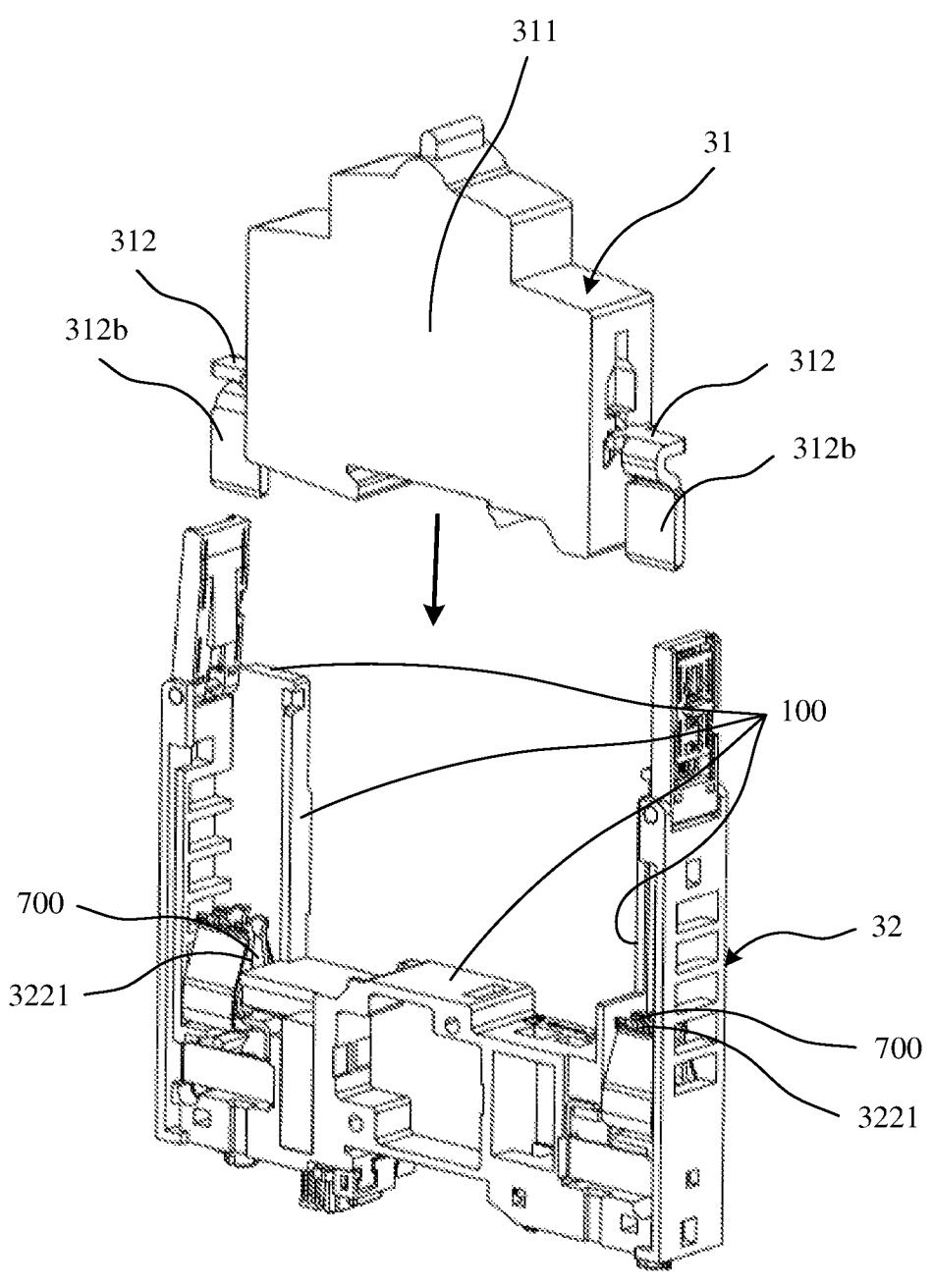
FIG. 10 is a schematic diagram of a structure of the circuit breaker shown in FIG. 8 being mounted onto a first surface of the base.

Specifically, FIG. 9 is an exploded view of the circuit breaker in the circuit breaker with a base shown in FIG. 8. As shown in FIG. 9, a wiring hole 311a is provided in a side wall of the circuit breaker body 311, and the terminal block (not shown in the figure) is provided in the wiring hole 311a. The terminal 312 includes a fixing portion 312a and a plug portion 312b fixed onto the fixing portion 312a. The fixing portion 312a extends into the wiring hole 311a and is electrically connected to the terminal block. The plug portion 312b protrudes from the side wall of the circuit breaker body 311. FIG. 10 is a schematic diagram of a structure of the circuit breaker shown in FIG. 8 being mounted onto a first surface of the base. As shown in FIG. 10, when the circuit breaker is connected to the first surface 100, the terminal 312 is plugged into the first conductive connection portion 3221 by means of the plug portion 312b, to achieve the electrical connection between the terminal 312 and the first conductive connection portion 3221.

In some other embodiments, if the terminal block of the circuit breaker body 311 protrudes from the surface of the circuit breaker body 311, the terminal 312 may alternatively be the terminal block of the circuit breaker body 311, which is not specifically limited herein.

There are two terminals 312, which are a positive terminal and a negative terminal, respectively. Correspondingly, as shown in FIG. 5, the base 32 also includes two conductive connection members 322, which are configured to achieve an electrical connection between the positive terminal and an anode cable, and between the negative terminal and a cathode cable, respectively.

As shown in FIG. 5, the first conductive connection portion 3221 is a U-shaped conductive elastic sheet, and a slot 700 is formed between two elastic arms of the U-shaped conductive elastic sheet. The slot 700 is configured for the plugging of the terminal 312 of the circuit breaker when the circuit breaker is connected to the first surface 100.

In this way, the electrical connection between the first conductive connection portion 3221 and the terminal 312 of the circuit breaker 31 is achieved by means of plugging, providing better stability of the electrical connection.

In some embodiments, the edge of one end of each of the elastic arms of the U-shaped conductive elastic sheet that surround the opening of the slot 700 is provided with at least one notch, which extends toward a bottom wall of the slot 700 to partition the elastic arm into a plurality of elastic arm units. The elastic arm unit includes an abutting portion, which is a portion that touches the terminal 312 of the circuit breaker 31 when the terminal 312 of the circuit breaker 31 is plugged into the slot 700. Distances between abutting portions of the plurality of elastic arm units and the bottom wall of the slot 700 in the depth direction of the slot 700 are different.

Figure 11:
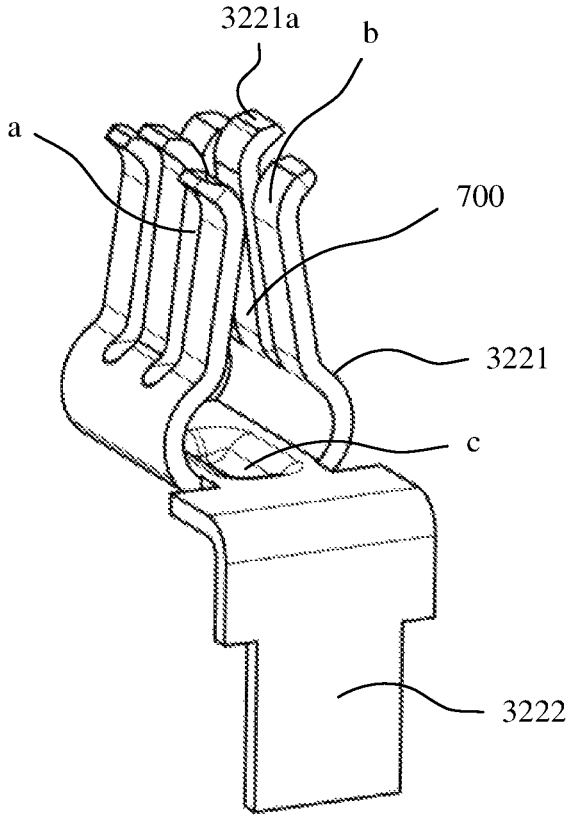
FIG. 11 is a schematic diagram of a structure of a conductive connection member in the base shown in FIG. 5.

For example, FIG. 11 is a schematic diagram of a structure of a conductive connection member in the base shown in FIG. 5. As shown in FIG. 11, in the two elastic arms of the U-shaped conductive elastic sheet, the edge of one end of each elastic arm that surrounds the opening of the slot 700 is provided with two notches a, which extend toward the bottom wall of the slot 700 to partition the elastic arm into three elastic arm units 3221a. Each of the three elastic arm units 3221a includes an abutting portion b. A distance between an abutting portion b of the middle one of the three elastic arm units 3221a and the bottom wall of the slot 700 in the depth direction of the slot 700 is a first distance, and distances between abutting portions b of the two side ones of the three elastic arm units 3221a and the bottom wall of the slot 700 in the depth direction of the slot 700 are equal and both are a second distance, where the first distance is greater than the second distance.

In this way, the elastic arm is split into a plurality of elastic arm units 3221a having independent abutting portions b, and time of contact between the abutting portions b of the plurality of elastic arm units 3221a and the terminal 312 of the circuit breaker 31 during the plugging of the circuit breaker 31 is different. During the plugging of the circuit breaker 31 when the base 32 is powered on (that is, the hot-plugging process), an electric arc is generated on an elastic arm unit 3221a that is first touched, thereby sacrificing electrical performance of the elastic arm unit 3221a. Therefore, the terminal 312 of the circuit breaker 31 can be effectively electrically connected to the remaining elastic arm units 3221a after being plugged into the slot 700. In this way, the elastic arms of the U-shaped conductive elastic sheet are prevented from being completely sacrificed due to the electric arc during the plugging of the terminal 312.

Figure 12:
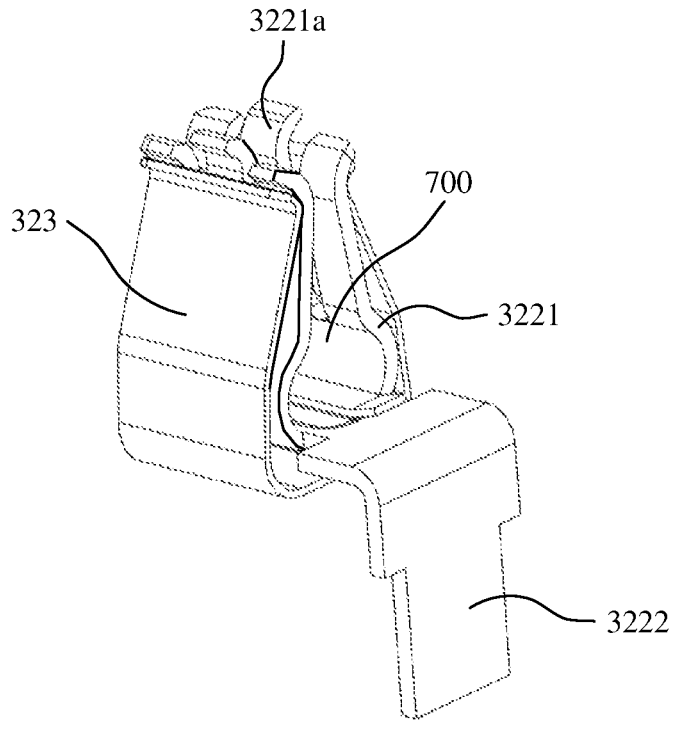
FIG. 12 is a schematic diagram of a structure of a connection between the conductive connection member in the base shown in FIG. 5 and a U-shaped securing sleeve.

In order to secure relative positions of the plurality of elastic arm units 3221a, in some embodiments, FIG. 12 is a schematic diagram of a structure of a connection between the conductive connection member in the base shown in FIG. 5 and a U-shaped securing sleeve. As shown in FIG. 12, the base 32 further includes a U-shaped securing sleeve 323. The U-shaped securing sleeve 323 is made of plastic or metal, and the U-shaped securing sleeve 323 has elasticity. The U-shaped securing sleeve 323 covers the U-shaped conductive elastic sheet to secure the relative positions of the plurality of elastic arm units 3221a of the U-shaped conductive elastic sheet, and increase an elastic clamping force between the two elastic arms of the U-shaped conductive elastic sheet, so that the U-shaped conductive elastic sheet can be in effective contact with and electrically connected to the terminal 312 of the circuit breaker 31.

The electrical connection between the second conductive connection portion 3222 and the cable terminal may be a plug-in electrical connection, a crimping electrical connection, or the like, which is not specifically limited herein.

Figure 13:
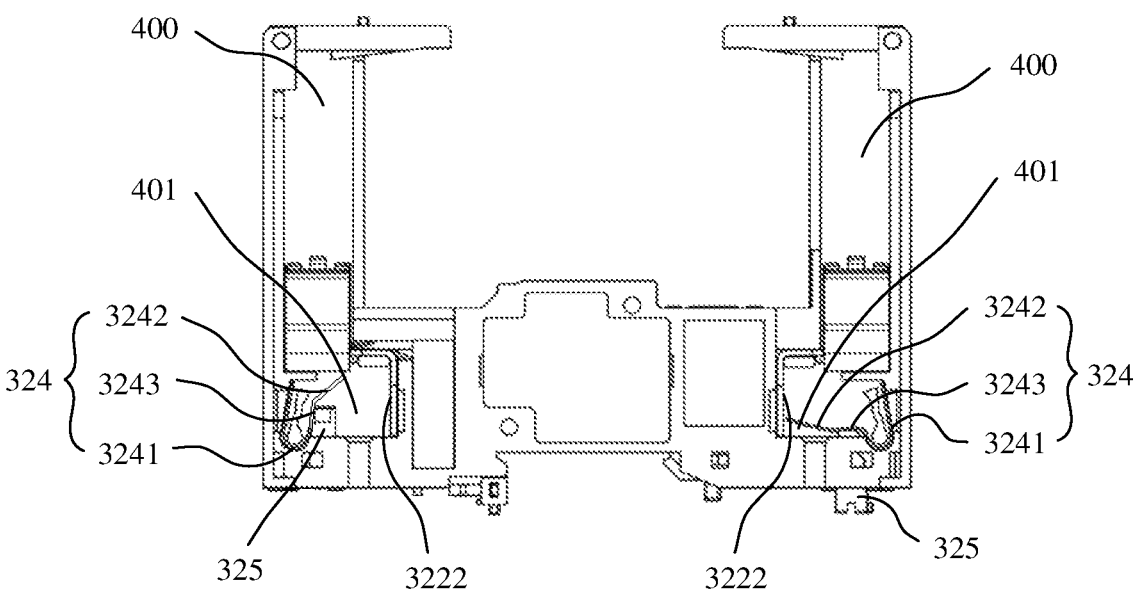
FIG. 13 is a schematic diagram of a structure of the base shown in FIG. 5 in a third orientation, with a baffle plate removed.

In some embodiments, FIG. 13 is a schematic diagram of a structure of the base shown in FIG. 5 in a third orientation, with a baffle plate 800 removed. As shown in FIG. 13, a cable terminal plug-in slot 401 is provided at a position close to the second connection port 321b in the accommodating cavity 400, and the opening of the cable terminal plug-in slot 401 is opposite the second connection port 321b. The second conductive connection portion 3222 constitutes one side wall of the cable terminal plug-in slot 401. After the cable terminal is plugged into the cable terminal plug-in slot 401 through the second connection port 321b, the cable terminal can be in contact with and electrically connected to the second conductive connection portion 3222.

As shown in FIG. 13, the base 32 further includes an elastic member 324. The elastic member 324 constitutes the other side wall of the cable terminal plug-in slot 401 opposite the second conductive connection portion 3222. The elastic member 324 is configured to apply an elastic pressing force toward the second conductive connection portion 3222 to the cable terminal when the cable terminal is plugged into the cable terminal plug-in slot 401 through the second connection port 321b, so as to crimp the cable terminal onto the second conductive connection portion 3222.

In this way, the secured relative position of and the electrical connection to the second conductive connection portion 3222 can be achieved immediately when the cable terminal is plugged into the cable terminal plug-in slot 401. This connection method is convenient to operate and has high efficiency. In addition, the design of the elastic force of the elastic member 324 can ensure the stability of the connection between the cable terminal and the second conductive connection portion 3222, preventing the cable terminal from falling off.

As shown in FIG. 5, the base 32 further includes a baffle plate 800. The baffle plate 800 and the first wall plate 321c constitute the other two side walls of the cable terminal plug-in slot 401, thereby defining the plugging position of the cable terminal.

The elastic member 324 includes, but is not limited to, a spring, an elastic sheet, and rubber. FIG. 13 shows merely an example in which the elastic member 324 is an elastic sheet, which should not be considered as limiting this application. When the elastic member 324 is an elastic sheet, specifically, as shown in FIG. 13, the elastic sheet includes a fixed portion 3241 and an elastic arm portion 3242. The fixed portion 3241 is fixed relative to the insulating housing 321. One end of the elastic arm portion 3242 is connected to the fixed portion 3241, and the other end of the elastic arm portion 3242 extends toward the second conductive connection portion 3222 and inclines toward the direction away from the second connection port 321b. The elastic arm portion 3242 constitutes the other side wall of the cable terminal plug-in slot 401 opposite the second conductive connection portion 3222.

In this way, during the plugging of the cable terminal into the cable terminal plug-in slot 401 through the second connection port 321b, the head of the cable terminal presses the elastic arm portion 3242, so that the elastic arm portion 3242 is bent and deformed to accumulate an elastic force, which is directed to the second conductive connection portion 3222. When the bending deformation produced by the elastic arm portion 3242 reaches a specific level, the accumulated elastic force can crimp the cable terminal onto the second conductive connection portion 3222, so as to achieve the secured relative position and the electrical connection between the cable terminal and the second conductive connection portion 3222. This structure is simple and easy to implement.

When an error occurs during the installation of the cable and the base 32 or in the later maintenance process of the base 32, the cable needs to be removed from the base 32. For ease of the removal of the cable, in some embodiments, as shown in FIG. 13, the base 32 further includes an unlocking device 325. The unlocking device 325 is configured to drive the elastic arm portion 3242 to move away from the second conductive connection portion 3222, so as to release the elastic pressing force applied to the cable terminal.

In this way, when an error occurs during the installation of the cable and the base 32 or in the later maintenance process of the base 32, the elastic arm portion 3242 may be driven by the unlocking device 325 to move away from the second conductive connection portion 3222, so as to release the elastic pressing force applied to the cable terminal, and the cable terminal is unplugged from the cable terminal plug-in slot 401 to implement the removal of the cable terminal from the base 32.

The unlocking device 325 has a plurality of structural forms, which is not specifically limited herein.

For example, the unlocking device 325 may be a pull cord connected to the elastic arm portion 3242, and the elastic arm portion 3242 can be pulled with the pull cord to move away from the second conductive connection portion 3222.

Figure 14:
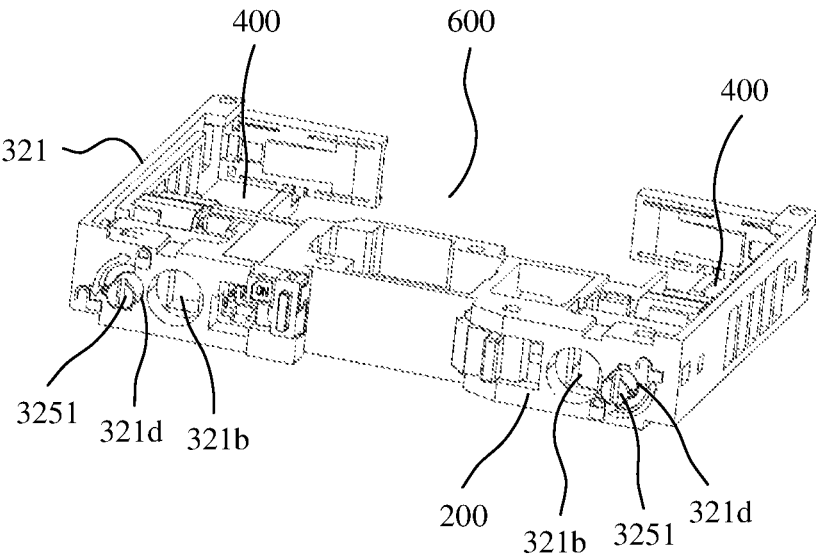
FIG. 14 is a schematic diagram of a structure of a second surface of the base shown in FIG. 13.

For another example, as shown in FIG. 14, the unlocking device 325 includes a push rod 3251. The elastic sheet further includes a connection portion 3243, and one end of the elastic arm portion 3242 is connected to the fixed portion 3241 by means of the connection portion 3243. FIG. 14 is a schematic diagram of a structure of a second surface of the base shown in FIG. 13. As shown in FIG. 14, a slide hole 321*d* is provided at a position opposite the connection portion 3243 (refer to FIG. 13) on the wall plate of the insulating housing 321 in which the second connection port 321*b* is located. The push rod 3251 slides through the slide hole 321*d*, and can slide to a first position (not shown in the figure) in the direction toward the connection portion 3243, to press the connection portion 3243 to bend in the direction away from the slide hole 321*d* and drive the elastic arm portion 3242 to move away from the second conductive connection portion 3222, so as to release the elastic pressing force applied to the cable terminal. This structure of the unlocking device 325 is simple and easy to implement.

In the foregoing embodiment, the unlocking device 325 further includes a first locking structure 3252. The first locking structure 3252 is configured to secure a relative position between the push rod 3251 and the slide hole 321*d* in the axial direction of the slide hole 321*d* after the push rod 3251 slides to the first position.

In this way, the push rod 3251 can be kept at the first position by the first locking structure 3252, so that the elastic arm portion 3242 is kept at a position where the elastic pressing force applied to the cable terminal is released. Therefore, the operator does not need to manually hold the push rod 3251, and the operator can unplug the cable terminal from the cable terminal plug-in slot 401 with one hand. The operation of removing the cable is convenient.

The first locking structure 3252 has a plurality of structural forms, which is not specifically limited herein.

For example, the first locking structure 3252 includes an elastic buckle and an elastic slot. One of the elastic buckle and the elastic slot is provided on the push rod 3251, and the other of the elastic buckle and the elastic slot is provided on the wall plate of the insulating housing 321 in which the slide hole 321*d* is located. When the push rod 3251 slides to the first position through the slide hole 321*d*, the elastic buckle is snapped into the elastic slot to secure the relative position between the push rod 3251 and the slide hole 321*d* in the axial direction of the slide hole 321*d*. This structure is simple and easy to implement.

Figure 15:
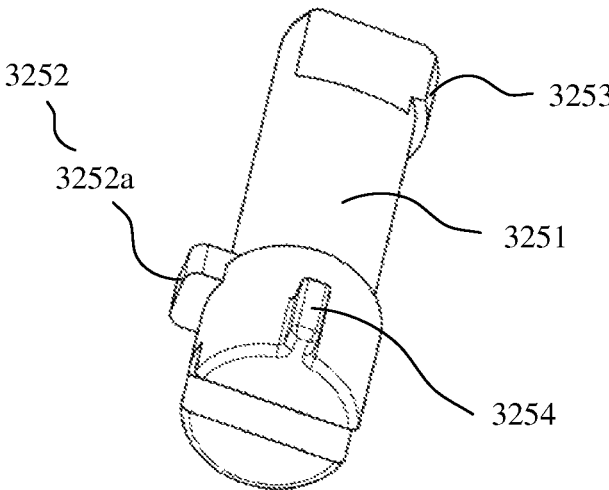
FIG. 15 is a perspective view of a push rod in the base shown in FIG. 14.
Figure 16:
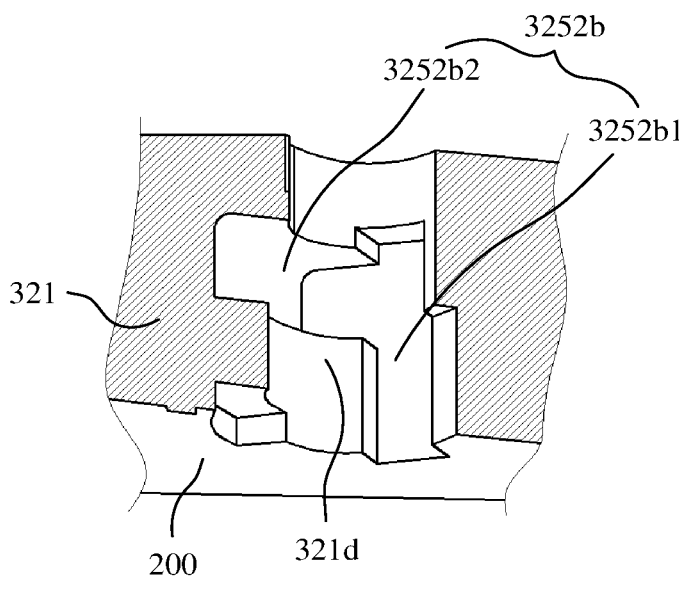
FIG. 16 is a schematic diagram of a structure of an inner surface of a slide hole in the base shown in FIG. 14.

For another example, FIG. 15 is a perspective view of a push rod in the base shown in FIG. 14. As shown in FIG. 15, the first locking structure 3252 includes a first slider 3252*a*, which is provided on a side wall of the push rod 3251. FIG. 16 is a schematic diagram of a structure of an inner surface of a slide hole in the base shown in FIG. 14. As shown in FIG. 16, the first locking structure 3252 further includes a first slide groove 3252*b*, which is provided on an inner wall of the slide hole 321*d*. The first slide groove 3252*b* includes a first slide groove section 3252*b*1 and a second slide groove section 3252*b*2. The first slide groove section 3252*b*1 extends along the axial direction of the slide hole 321*d*, the second slide groove section 3252*b*2 extends along the circumferential direction of the slide hole 321*d*, and one end of the second slide groove section 3252*b*2 is connected to one end of the first slide groove section 3252*b*1 close to the connection portion 3243. The first slider 3252*a* is slidably connected in the first slide groove 3252*b*, and the first slider 3252*a* slides in the first slide groove section 3252*b*1 during the sliding of the push rod 3251 to the first position. When the push rod 3251 slides to the first position, the first slider 3252*a* slides to the end of the first slide groove section 3252*b*1 close to the connection portion 3243. After the push rod 3251 slides to the first position, the first slider 3252*a* can slide from the first slide groove section 3252*b*1 into the second slide groove section 3252*b*2.

In this way, after the push rod 3251 slides to the first position, the push rod 3251 may be rotated, and the first slider 3252*a* may be driven to slide from the first slide groove section 3252*b*1 into the second slide groove section 3252*b*2, thereby securing the relative position between the push rod 3251 and the slide hole 321*d* in the axial direction of the slide hole 321*d* and keeping the push rod 3251 in the first position. This structure is simple and easy to implement.

It can be known that, in the foregoing embodiment, the positions of the first slider 3252*a* and the first slide groove 3252*b* may alternatively be provided as follows: The first slider 3252*a* is provided on the inner wall of the slide hole 321*d*, and the first slide groove 3252*b* is provided on the side wall of the push rod 3251. In this way, the effect achieved is the same as the effect achieved by the foregoing embodiment, which is not repeated herein.

To prevent the push rod 3251 from falling out of the insulating housing 321 through the slide hole 321*d*, in some embodiments, as shown in FIG. 15, one end of the push rod 3251 close to the connection portion 3243 is inside the insulating housing 321, and a first stopper protrusion 3253 is provided on a side wall of the end of the push rod 3251 close to the connection portion 3243. The first stopper protrusion 3253 is configured to prevent the push rod 3251 from falling out of the insulating housing 321 through the slide hole 321*d*.

To prevent the push rod 3251 from falling into the inner space of the insulating housing 321 through the slide hole 321*d*, in some embodiments, as shown in FIG. 15, one end of the push rod 3251 away from the connection portion 3243 is outside the insulating housing 321, and a second stopper protrusion 3254 is provided on a side wall of the end of the push rod 3251 away from the connection portion 3243. The second stopper protrusion 3254 is spaced from the insulating housing 321. When the push rod 3251 slides to the first position in the direction toward the connection portion 3243, the second stopper protrusion 3254 abuts against an outer surface of the insulating housing 321.

In this way, the second stopper protrusion 3254 can prevent the push rod 3251 from falling into the inner space of the insulating housing 321 through the slide hole 321*d*. This structure is simple and easy to implement.

Figure 17:
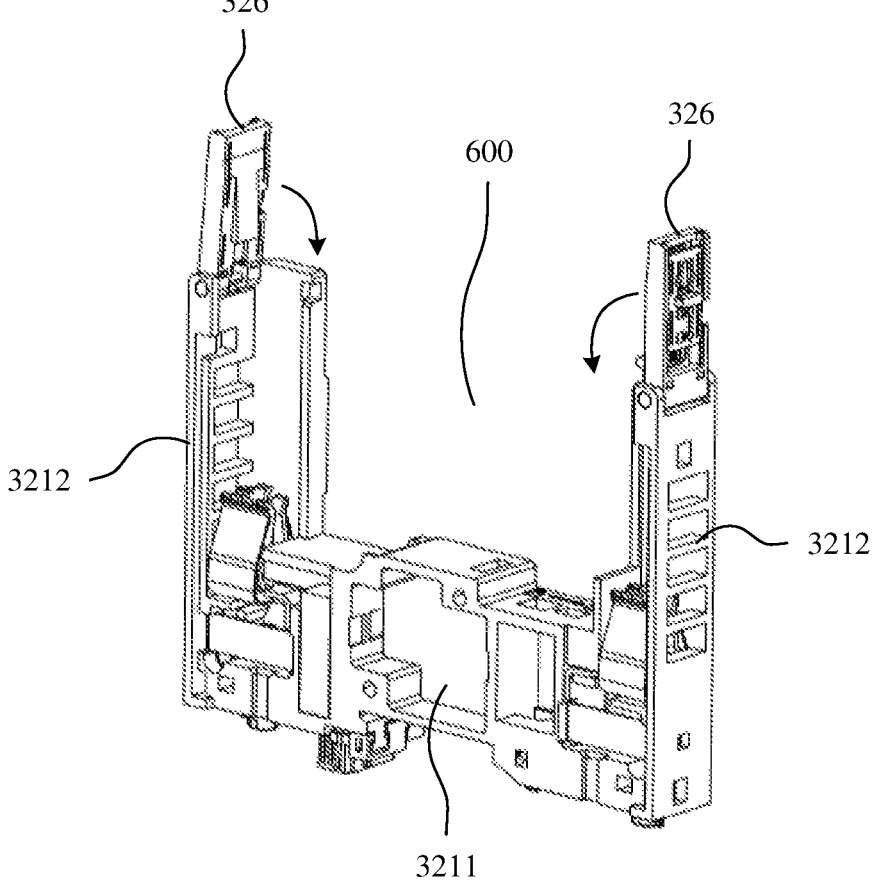
FIG. 17 is a schematic diagram of a structure of a cover plate in the base shown in FIG. 5 in a second position.
Figure 18:
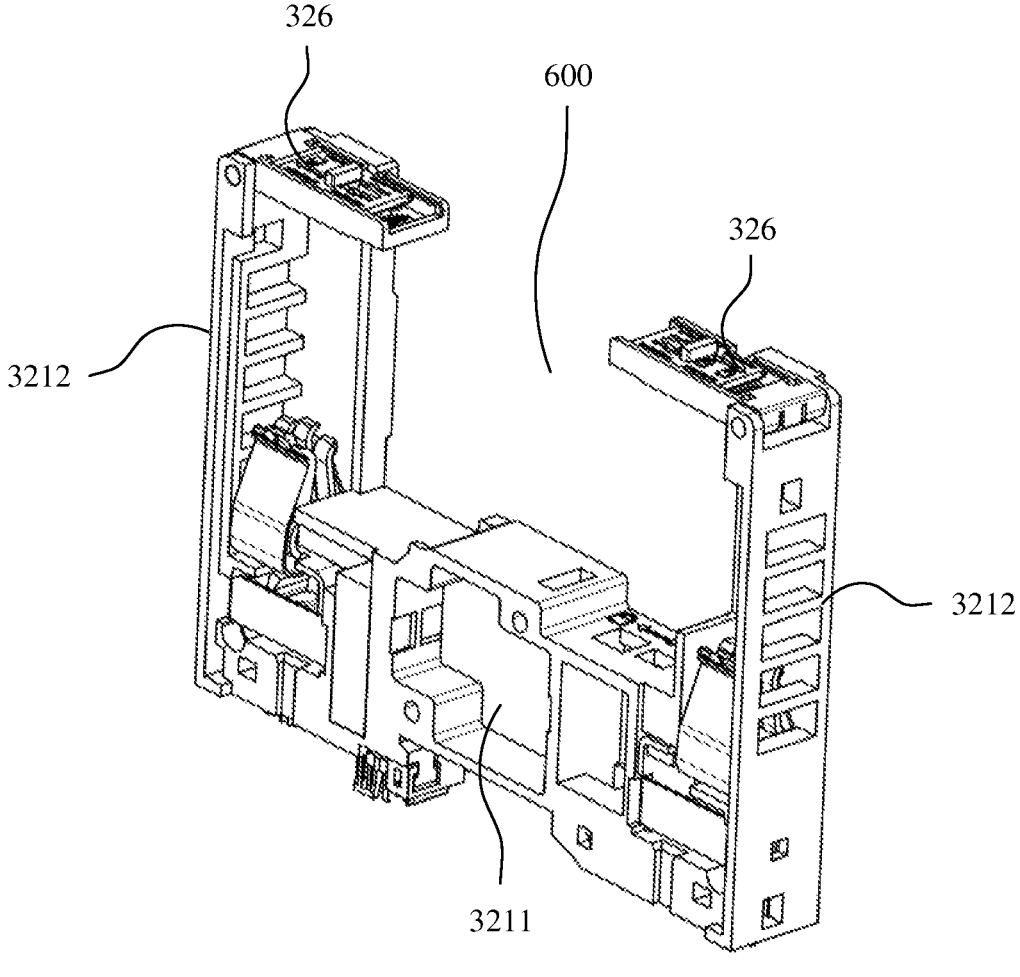
FIG. 18 is a schematic diagram of a structure of the cover plate in the base shown in FIG. 5 in a third position.

In some embodiments, as shown in FIG. 5, the base 32 further includes a cover plate 326. One end of the cover plate 326 is rotatably connected to the end of the side arm portion 3212 away from the bottom arm portion 3211. An axis of rotation of the cover plate 326 is parallel to the sliding direction of the insulating housing 321 relative to the mounting rail (that is, the direction X in FIG. 5). The cover plate 326 can be rotated from a second position to a third position in the direction toward the second mounting slot 600. FIG. 17 is a schematic diagram of a structure of a cover plate in the base shown in FIG. 5 in a second position. As shown in FIG. 17, when the cover plate 326 is in the second position, the cover plate 326 does not cover the opening of the second mounting slot 600. At this time, the circuit breaker 31 can be snapped into the second mounting slot 600, or can be unplugged out of the second mounting slot 600. FIG. 18 is a schematic diagram of a structure of the cover plate in the base shown in FIG. 5 in a third position.

As shown in FIG. 18, when the cover plate 326 is in the third position, the cover plate 326 covers the opening of the second mounting slot 600. At this time, the cover plate 326 can prevent the circuit breaker 31 from falling out of the second mounting slot 600. Therefore, the mounting stability of the circuit breaker 31 on the base 32 can be improved.

It should be noted that the opening of the second mounting slot 600 described in the foregoing embodiment is an opening at one end of the second mounting slot 600 away from the bottom arm portion 3211, and the circuit breaker 31 is snapped into or unplugged out of the second mounting slot 600 through this opening.

In some embodiments, the base 32 further includes a second locking structure. The second locking structure is provided between the cover plate 326 and the side arm portion 3212. The second locking structure is configured to secure a relative position between the cover plate 326 and the side arm portion 3212 when the cover plate 326 is rotated to the third position. In this way, the cover plate 326 can prevent the circuit breaker 31 from falling out of the second mounting slot 600.

The second locking structure has a plurality of structural forms, such as a bolt or a positioning pin, which is not specifically limited herein.

Figure 19:
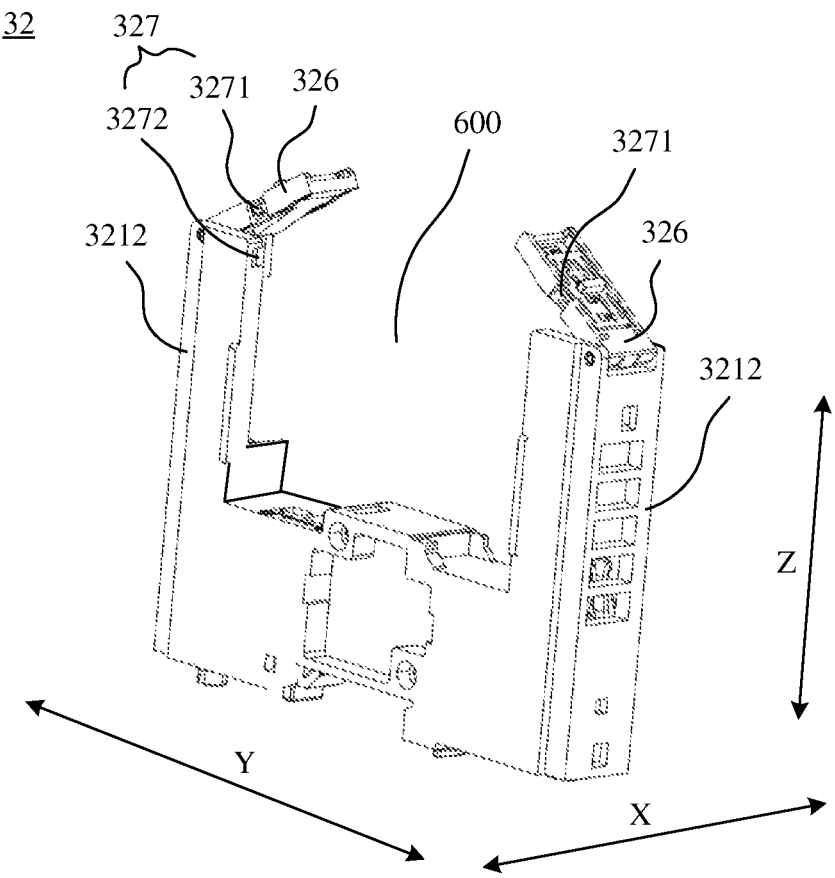
FIG. 19 is a schematic diagram of a structure of a connection between the cover plate in the base shown in FIG. 5 and a side arm portion.

In some embodiments, FIG. 19 is a schematic diagram of a structure of a connection between the cover plate in the base shown in FIG. 5 and a side arm portion. As shown in FIG. 19, the second locking structure 327 includes an elastic snapping arm 3271 and a snapping notch 3272. The elastic snapping arm 3271 is provided on the cover plate 326, and the elastic snapping arm 3271 extends along the sliding direction of the insulating housing 321 relative to the mounting rail (that is, the direction X shown in FIG. 19). The snapping notch 3272 is provided on the side arm portion 3212, and the opening of the snapping notch 3272 faces the second mounting slot 600. When the cover plate 326 is rotated to the third position, the elastic snapping arm 3271 is snapped into the snapping notch 3272. This structure is simple and easy to implement. In addition, when an acting force applied to the cover plate 326 can overcome an elastic snapping force between the elastic snapping arm 3271 and the snapping notch 3272, the cover plate 326 can be driven to return to the second position to expose the opening of the second mounting slot 600. At this time, the circuit breaker 31 can be replaced or mounted.

Figure 20:
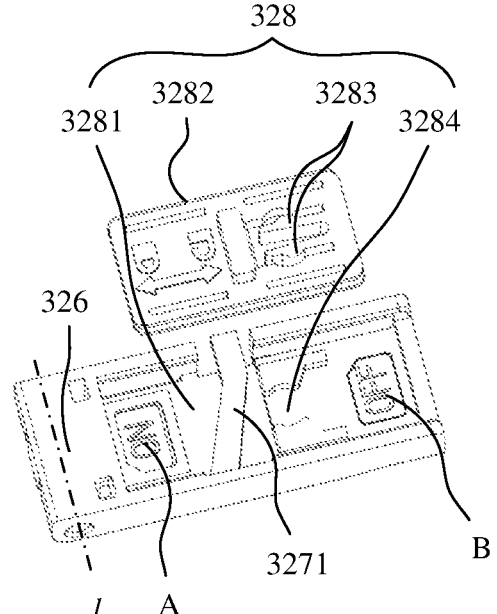
FIG. 20 is an exploded view of the cover plate in the base shown in FIG. 5.

To further prevent the circuit breaker 31 from falling out of the second mounting slot 600, in some embodiments, FIG. 20 is an exploded view of the cover plate in the base shown in FIG. 5. As shown in FIG. 20, the base 32 further includes a third locking structure 328. The third locking structure 328 is configured to secure a relative position between the elastic snapping arm 3271 and the snapping notch 3272 when the cover plate 326 is rotated to the third position. In this way, the cover plate 326 is double-locked, so that the cover plate 326 can effectively prevent the circuit breaker 31 from falling out of the second mounting slot 600.

In the foregoing embodiment, the third locking structure 328 has a plurality of structural forms, which is not specifically limited herein.

In some embodiments, as shown in FIG. 20, the third locking structure 328 includes a second slide groove 3281 and a second slider 3282. The second slide groove 3281 is provided on the cover plate 326, and the second slide groove 3281 extends along a direction parallel to the cover plate 326 and perpendicular to the axis/of rotation of the cover plate 326. The second slider 3282 is slidably connected in the second slide groove 3281, and the second slider 3282 can slide from a fourth position to a fifth position along the second slide groove 3281 in the direction toward the axis/of rotation of the cover plate 326.

The third locking structure 328 further includes a stopper buckle 3283 and a stopper slot 3284. The stopper buckle 3283 is provided on the second slider 3282, and the stopper slot 3284 is provided on a bottom surface of the second slide groove 3281. When the second slider 3282 slides from the fourth position to the fifth position, the second slider 3282 drives the stopper buckle 3283 to be slidably snapped into the stopper slot 3284, and makes the stopper buckle 3283 abut against a surface of the elastic snapping arm 3271 away from the axis/of rotation of the cover plate 326.

In this way, the elastic snapping arm 3271 can be locked in the snapping notch 3272 to secure the relative position between the elastic snapping arm 3271 and the snapping notch 3272. This structure is simple and easy to implement. In addition, when an acting force applied to the second slider 3282 can overcome an elastic snapping force between the stopper buckle 3283 and the stopper slot 3284, the second slider 3282 can be driven to return to the fourth position to unlock the elastic snapping arm 3271, so that the elastic snapping arm 3271 can slide out of the snapping notch 3272 under the action of an external force.

Figure 21:
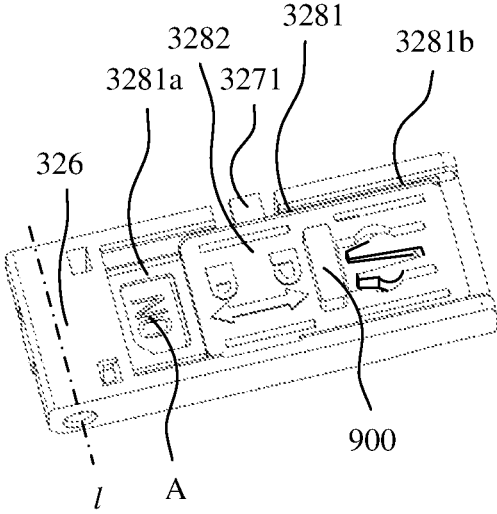
FIG. 21 is a schematic diagram of a structure of a second slider of the cover plate in the base shown in FIG. 5 in a fourth position.
Figure 22:
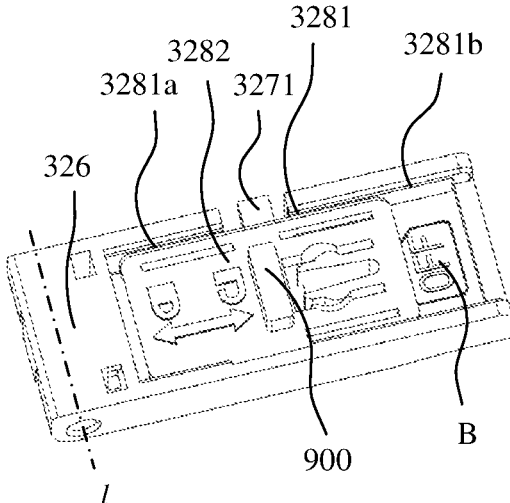
FIG. 22 is a schematic diagram of a structure of the second slider of the cover plate in the base shown in FIG. 5 in a fifth position.

In some embodiments, FIG. 21 is a schematic diagram of a structure of a second slider of the cover plate in the base shown in FIG. 5 in a fourth position. As shown in FIG. 21, the second slide groove 3281 includes a third slide groove section 3281*a* and a fourth slide groove section 3281*b*, and the fourth slide groove section 3281*b* is located on the side of the third slide groove section 3281*a* away from the axis of rotation of the cover plate 326. When the second slider 3282 is in the fourth position, the second slider 3282 is located in the fourth slide groove section 3281*b*, and is not located in the third slide groove section 3281*a*. FIG. 22 is a schematic diagram of a structure of the second slider of the cover plate in the base shown in FIG. 5 in a fifth position. As shown in FIG. 22, when the second slider 3282 is in the fifth position, the second slider 3282 is located in the third slide groove section 3281*a*, and is not located in the fourth slide groove section 3281*b*. A bottom surface of the third slide groove section 3281*a* is provided with a first sign A, and a bottom surface of the fourth slide groove section 3281*b* is provided with a second sign B. The first sign A is different from the second sign B.

In this way, when the second slider 3282 is in the fourth position, the first sign A is revealed, which means that the elastic snapping arm 3271 is in an unlocked state; and when the second slider 3282 is in the fifth position, the second sign B is revealed, which means that the elastic snapping arm 3271 is in a locked state. Therefore, it can be determined from the first sign A and the second sign B that the elastic snapping arm 3271 is in the unlocked state or the locked state.

In the foregoing embodiment, the first sign A may be the word "ON", or may be a green coating area, or may include a green coating area and the word "ON" provided on the green coating area. Certainly, the first sign A may also be another sign, which is not specifically limited herein.

Correspondingly, the second sign B may be the word "OFF", or may be a red coating area, or may include a red coating area and the word "OFF" provided on the red coating area. Certainly, the second sign B may also be another sign, which is not specifically limited herein.

To drive the second slider 3282 to slide in the second slide groove 3281, in some embodiments, as shown in FIG. 21 or FIG. 22, the second slider 3282 is provided with a handle

900, through which the second slider 3282 can be driven to slide in the second slide groove 3281.

Figure 23:
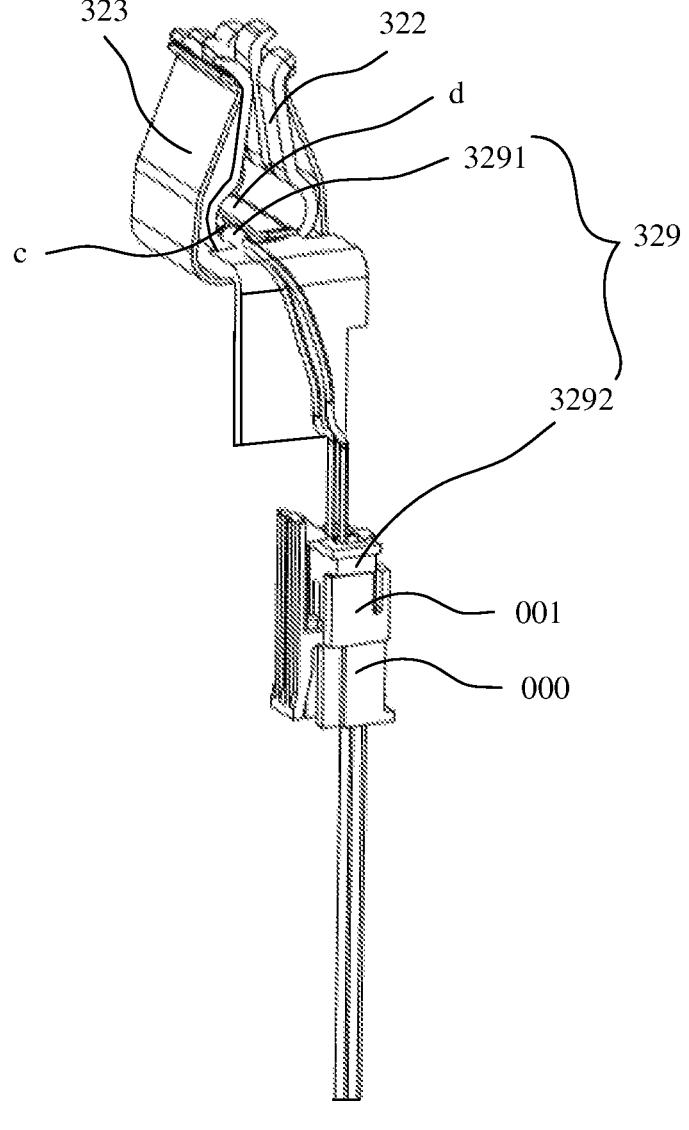
FIG. 23 is an assembly diagram of the conductive connection member, the U-shaped securing sleeve, and a temperature measurement module in the base shown in FIG. 5.

In some embodiments, FIG. 23 is an assembly diagram of the conductive connection member, the U-shaped securing sleeve, and a temperature measurement module in the base shown in FIG. 5. As shown in FIG. 23, the base 32 further includes a temperature measurement module 329. The temperature measurement module 329 includes a temperature sensor 3291 and a wiring socket 3292. The temperature sensor 3291 includes, but is not limited to, a thermal element such as an NTC thermistor or a thermocouple. A cathode wiring and an anode wiring of the temperature sensor 3291 are both electrically connected to the wiring socket 3292, and a wiring plug 000 is plugged into the wiring socket 3292, thereby implementing the wiring of positive and negative terminals of the temperature sensor 3291.

When the temperature measurement module 329 is mounted in the base 32, as shown in FIG. 5, the temperature measurement module 329 is disposed in the accommodating cavity 400.

As shown in FIG. 23, the temperature sensor 3291 is disposed on the conductive connection member 322 to measure a temperature of the conductive connection member 322, thereby preventing the conductive connection member 322 from being deformed or even causing a fire due to overtemperature.

Optionally, as shown in FIG. 11, a temperature sensor accommodating trough c is formed on the U-shaped conductive elastic sheet of the conductive connection member 322. As shown in FIG. 23, the temperature sensor 3291 is mounted in the temperature sensor accommodating trough c, and a shielding sheet d is provided at the opening of the temperature sensor accommodating trough c. The shielding sheet d is connected to the U-shaped securing sleeve 323, and the shielding sheet d and the U-shaped securing sleeve 323 are integrally formed. In this way, the temperature sensor 3291 can be prevented from falling out of the conductive connection member 322. This structure is simple and easy to implement.

Figure 24A:
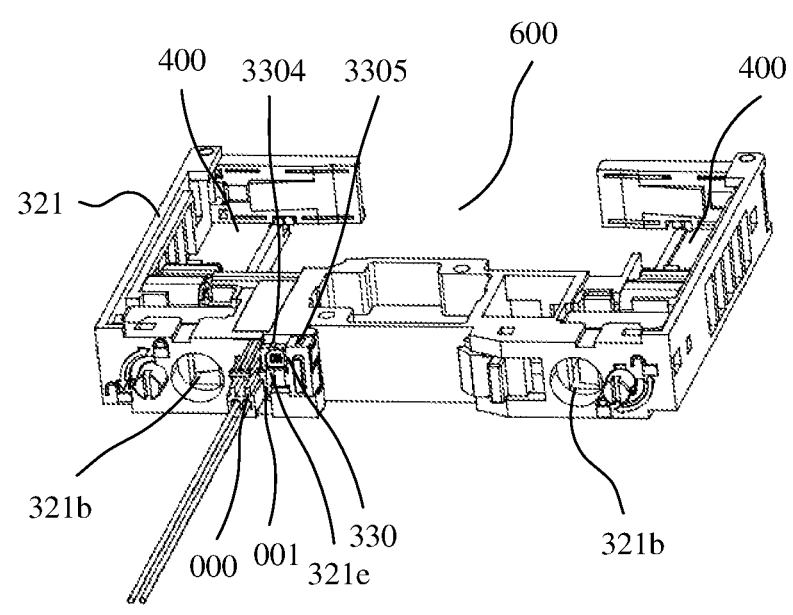
FIG. 24a is a schematic diagram of a structure of the base shown in FIG. 5 in a fourth orientation.

In addition, FIG. 24a is a schematic diagram of a structure of the base shown in FIG. 5 in a fourth orientation. As shown in FIG. 24a, the insulating housing 321 is further provided with a third connection port 321e, which is in communication with the accommodating cavity 400. The wiring socket 3292 is disposed close to the third connection port 321e, and the third connection port 321e allows the wiring plug 000 to extend into the accommodating cavity 400 so as to be plugged into the wiring socket 3292.

As shown in FIG. 5 and FIG. 24a, the base 32 further includes a fourth locking structure 330. The fourth locking structure 330 is provided on the outer surface of the insulating housing 321, and the fourth locking structure 330 is configured to secure a relative position between the wiring plug 000 and the wiring socket 3292 after the wiring plug 000 is plugged into the wiring socket 3292 through the third connection port 321e.

In this way, the relative position between the wiring plug 000 and the wiring socket 3292 can be secured by the fourth locking structure 330 to prevent the wiring plug 000 from falling out of the wiring socket 3292.

The fourth locking structure 330 has a plurality of structural forms, which is not specifically limited herein.

In some embodiments, as shown in FIG. 23, a boss 001 is provided around a side wall of the wiring plug 000. During the plugging of the wiring plug 000 into the wiring socket

3292 through the third connection port 321e, the boss 001 extends into the third connection port 321e along with the wiring plug 000.

Figure 24B:
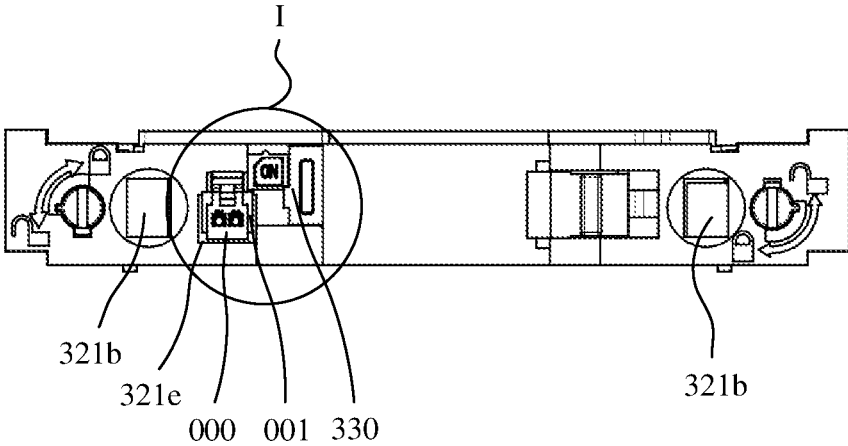
Figure 24C:
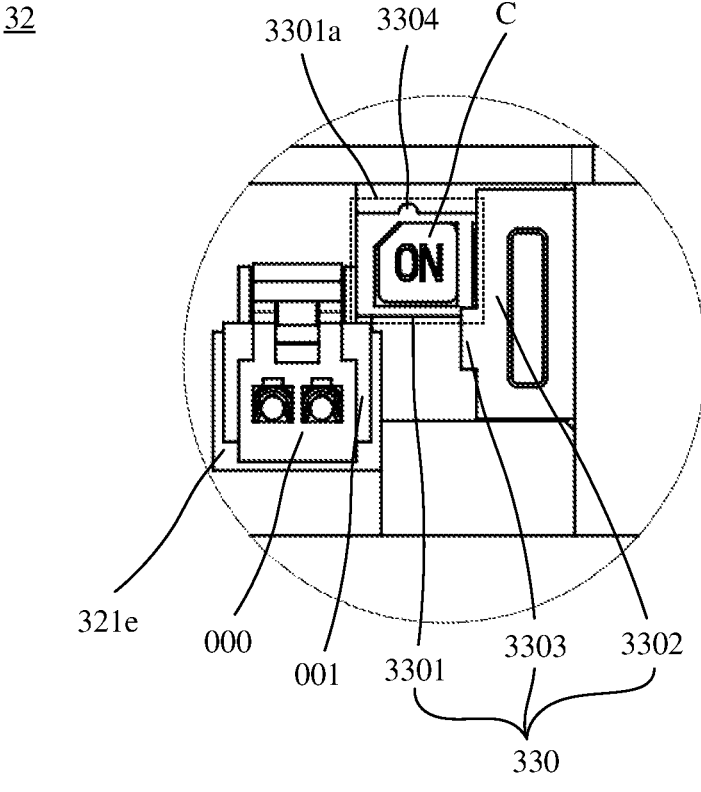
FIG. 24c is a partial enlarged view of a region I in the base shown in FIG. 24b.
Figure 25A:
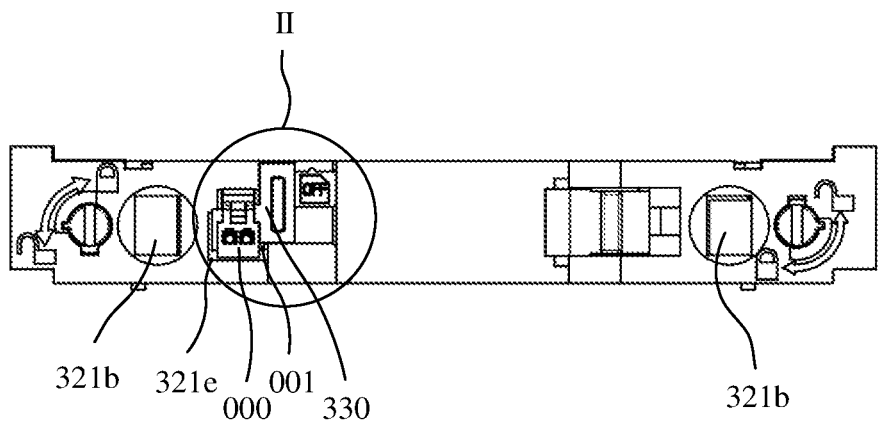
FIG. 25a is a schematic diagram of a structure of a third slider of the fourth locking structure in the base shown in FIG. 24a in a seventh position.
Figure 25B:
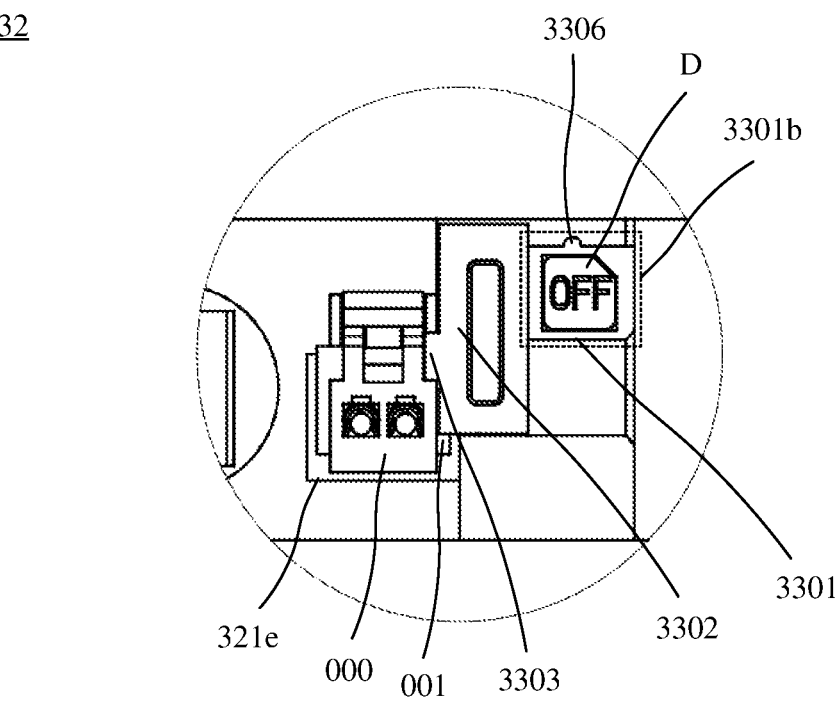

FIG. 24b is a schematic diagram of a structure of a surface on which a fourth locking structure is located in the base shown in FIG. 24a. FIG. 24c is a partial enlarged view of a region I in the base shown in FIG. 24b. As shown in FIG. 24c, the fourth locking structure 330 includes a slide rail 3301, a third slider 3302, and a stopper 3303. The slide rail 3301 is provided on the outer surface of the insulating housing 321, and the slide rail 3301 extends toward the third connection port 321e. The third slider 3302 is slidably connected to the slide rail 3301. The stopper 3303 is provided at one end of the third slider 3302 close to the third connection port 321e. The third slider 3302 can slide from a sixth position to a seventh position along the slide rail 3301 in the direction toward the third connection port 321e. FIG. 25a is a schematic diagram of a structure of a third slider of the fourth locking structure in the base shown in FIG. 24a in a seventh position. FIG. 25b is a partial enlarged view of a region II in the base shown in FIG. 25a. As shown in FIG. 24c and FIG. 25b, the third slider 3302 drives the stopper 3303 to move from a position not covering the third connection port 321e to a position covering the third connection port 321e. Therefore, the boss 001 can be stopped by the stopper 3303 to lock the wiring plug 000 and prevent the wiring plug 000 from falling out of the wiring socket 3292.

In the foregoing embodiment, as shown in FIG. 24a, the fourth locking structure 330 further includes a first elastic buckle 3304 and a first elastic slot 3305. As shown in FIG. 24c, the first elastic buckle 3304 is provided on the slide rail 3301. As shown in FIG. 24a, the first elastic slot 3305 is provided on the third slider 3302. When the third slider 3302 slides to the seventh position, the first elastic buckle 3304 is snapped into the first elastic slot 3305. In this way, when the third slider 3302 slides to the seventh position, a relative position between the slide rail 3301 and the third slider 3302 can be secured, preventing displacement of the stopper 3303 when stopping the boss 001. When an acting force applied to the third slider 3302 can overcome an elastic snapping force between the first elastic buckle 3304 and the first elastic slot 3305, the third slider 3302 can be driven to return to the sixth position to unlock the wiring plug 000, so that the wiring plug 000 can be unplugged out of the wiring socket 3292.

It can be known that, the positions of the first elastic buckle 3304 and the first elastic slot 3305 may alternatively be provided as follows: The first elastic buckle 3304 is provided on the third slider 3302, and the first elastic slot 3305 is provided on the slide rail 3301. This is not specifically limited herein.

In some embodiments, as shown in FIG. 24c and FIG. 25b, the slide rail 3301 includes a first slide rail section 3301a and a second slide rail section 3301b, and the second slide rail section 3301b is located on the side of the first slide rail section 3301a away from the third connection port 321e. When the third slider 3302 is in the sixth position, as shown in FIG. 24c, the third slider 3302 is located on the second slide rail section 3301b and is not located on the first slide rail section 3301a. When the third slider 3302 is in the seventh position, as shown in FIG. 25b, the third slider 3302 is located on the first slide rail section 3301a and is not located on the second slide rail section 3301b. The first slide rail section 3301a is provided with a third sign C, and the second slide rail section 3301b is provided with a fourth sign D. The third sign C is different from the fourth sign D.

In this way, when the third slider 3302 is in the sixth position, the third sign C is revealed, which means that the wiring plug 000 is in an unlocked state; and when the third slider 3302 is in the seventh position, the fourth sign D is revealed, which means that the wiring plug 000 is in a locked state. Therefore, it can be determined from the third sign C and the fourth sign D that the wiring plug 000 is in the unlocked state or the locked state.

In the foregoing embodiment, the third sign C may be the word "ON", or may be a green coating area, or may include a green coating area and the word "ON" provided on the green coating area. Certainly, the third sign C may also be another sign, which is not specifically limited herein.

Correspondingly, the fourth sign D may be the word "OFF", or may be a red coating area, or may include a red coating area and the word "OFF" provided on the red coating area. Certainly, the fourth sign D may also be another sign, which is not specifically limited herein.

In some embodiments, as shown in FIG. 25*b*, the fourth locking structure 330 may further include a third elastic buckle 3306. The third elastic buckle 3306 is provided on the slide rail 3301. When the third slider 3302 is in the sixth position, the third elastic buckle 3306 is snapped into the first elastic slot 3305. In this way, when the third slider 3302 is in the sixth position, the relative position between the slide rail 3301 and the third slider 3302 can be secured by the third elastic buckle 3306 and the first elastic slot 3305, preventing displacement of the stopper 3303. When an acting force applied to the third slider 3302 can overcome an elastic snapping force between the third elastic buckle 3306 and the first elastic slot 3305, the third slider 3302 can be driven to slide to the seventh position to lock the wiring plug 000.

Figure 26:
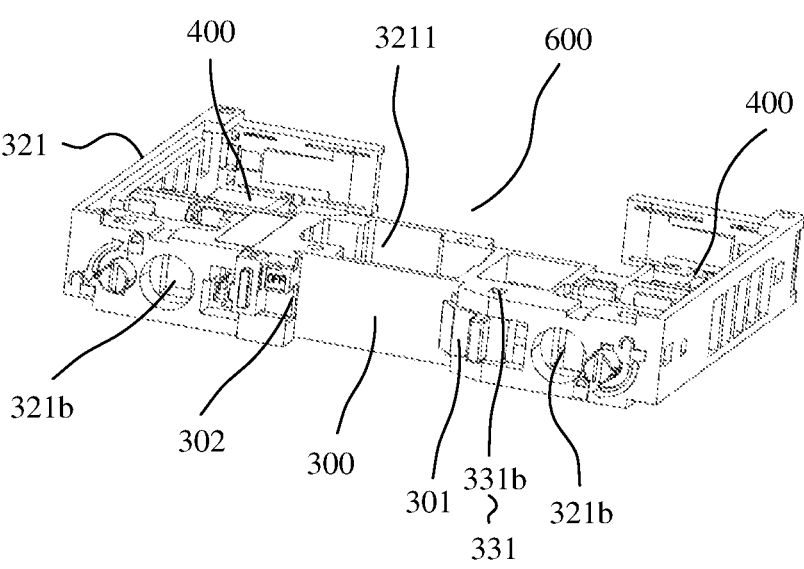
FIG. 26 is a schematic diagram of a structure of the base shown in FIG. 5 in a fifth orientation.

In some embodiments, FIG. 26 is a schematic diagram of a structure of the base shown in FIG. 5 in a fifth orientation. As shown in FIG. 26, a first claw 301 and a second claw 302 are provided on a surface of the bottom arm portion 3211 away from the second mounting slot 600, and the first claw 301 and the second claw 302 constitute two opposite side walls of the first mounting slot 300. The second claw 302 is fixed relative to the bottom arm portion 3211, and the first claw 301 can move from an eighth position to a ninth position in the direction toward the second claw 302, to drive the first claw 301 and the second claw 302 to be snapped onto the mounting rail in the power distribution equipment. In this way, the first claw 301 and the second claw 302 can be slidably snapped onto the mounting rail in the power distribution equipment.

In the foregoing embodiment, the base 32 further includes a fifth locking structure 331. The fifth locking structure 331 is provided between the first claw 301 and the bottom arm portion 3211. The fifth locking structure 331 is configured to secure a relative position between the first claw 301 between the bottom arm portion 3211 when the first claw 301 moves to the ninth position. In this way, after the first claw 301 and the second claw 302 are slidably snapped onto the mounting rail in the power distribution equipment, the insulating housing can be prevented from falling off the mounting rail due to displacement of the first claw 301.

The fifth locking structure 331 has a plurality of structural forms, which is not specifically limited herein.

Figure 27:
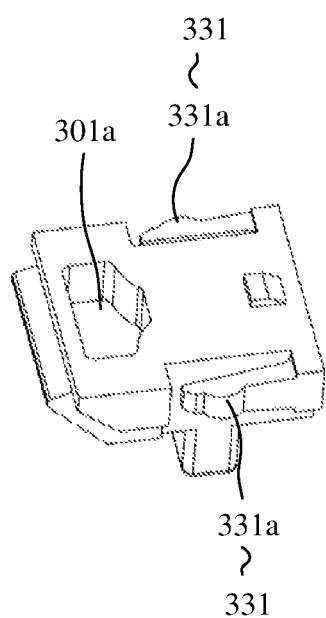
FIG. 27 is a perspective view of a first claw in the base shown in FIG. 26.

In some embodiments, FIG. 27 is a perspective view of a first claw in the base shown in FIG. 26. As shown in FIG. 27, the fifth locking structure 331 includes a second elastic buckle 331*a*. As shown in FIG. 26, the fifth locking structure 331 further includes a second elastic slot 331*b*. The second elastic buckle 331*a* is provided on the first claw 301, and the second elastic slot 331*b* is provided on the bottom arm portion 3211. When the first claw 301 moves to the ninth position, the second elastic buckle 331*a* is snapped into the second elastic slot 331*b*. When an acting force applied to the first claw 301 can overcome an elastic snapping force between the second elastic buckle 331*a* and the second elastic slot 331*b*, the first claw 301 can be driven to return to the eighth position. This structure is simple and easy to implement.

It can be known that, the positions of the second elastic buckle 331*a* and the second elastic slot 331*b* may alternatively be provided as follows: The second elastic buckle 331*a* is provided on the bottom arm portion 3211, and the second elastic slot 331*b* is provided on the first claw 301. This is not specifically limited herein.

Figure 28:
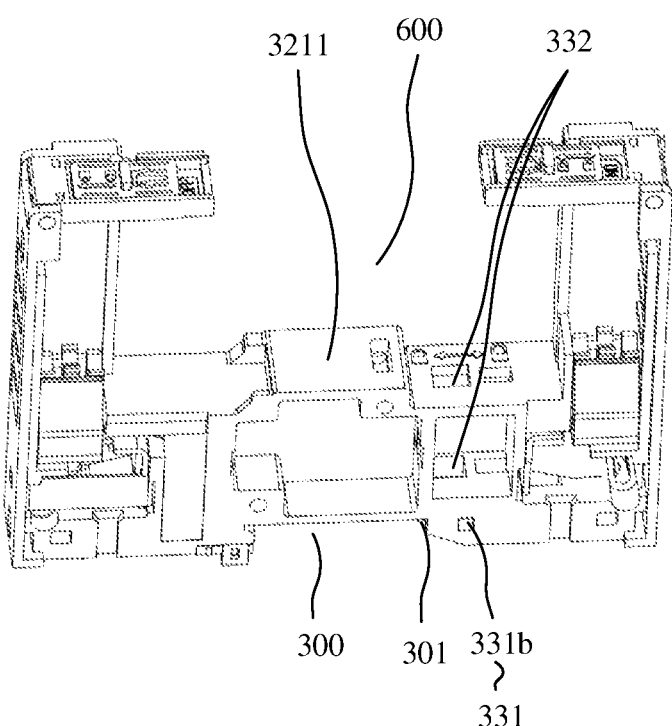
FIG. 28 is a schematic diagram of a structure of the base shown in FIG. 5 in a sixth orientation.

To drive the first claw 301 to move to the eighth position or the ninth position, in some embodiments, as shown in FIG. 27, a lifting slot 301*a* is provided on a surface of the first claw 301 facing the bottom arm portion 3211. FIG. 28 is a schematic diagram of a structure of the base shown in FIG. 5 in a sixth orientation. As shown in FIG. 28, an operation hole 332 is provided at a position on the bottom arm portion 3211 corresponding to the lifting slot 301*a*. The operation hole 332 extends through the bottom arm portion 3211 along the second direction. The operation hole 332 allows the lifting lever to extend into the lifting slot 301*a* to drive the first claw 301 to move to the eighth position or the ninth position. In this way, the operator can drive the first claw 301 to move to the eighth position or the ninth position from the front side of the base 32. This operation is convenient and easy to implement.

In the descriptions of this specification, the described specific features, structures, materials, or characteristics may be combined in a proper manner in any one or more of embodiments or examples.

Finally, it should be noted that the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. A base, comprising:
an insulating housing, wherein:
the insulating housing has a first surface and a second surface that are away from each other, wherein the first surface is configured for a detachable connection of a circuit breaker, and the second surface has a first mounting slot;
the insulating housing is configured to be slidably snapped into a mounting rail in power distribution equipment by using the first mounting slot, wherein an accommodating cavity is provided in the insulating housing, the accommodating cavity is configured to accommodate a conductive connection member, one end of the accommodating cavity is open along a sliding direction of the insulating housing relative to the mounting rail, and the other end of the accommodating cavity is closed; and
the insulating housing has a first connection port and a second connection port, both the first connection port and the second connection port are in communication with the accommodating cavity, the first connection port is configured to allow a terminal of the circuit breaker to extend into the accommodating cavity when the circuit breaker is connected to the first surface, and the second connection port is configured to allow a cable terminal to extend into the accommodating cavity.

2. The base according to claim 1, wherein:

the insulating housing comprises a bottom arm portion and two side arm portions, one end of each of the two side arm portions is connected to either end of the bottom arm portion along a first direction, and another end of each of the two side arm portions extends towards a same side of the bottom arm portion along a second direction;

the bottom arm portion and the two side arm portions enclose a second mounting slot, and the second mounting slot is configured for snap-fitting of the circuit breaker;

an inner surface of the second mounting slot and surfaces of the side arm portions away from the bottom arm portion form the first surface of the insulating housing, and a surface of the bottom arm portion away from the second mounting slot forms the second surface; and the sliding direction of the insulating housing relative to the mounting rail, the first direction, and the second direction are perpendicular to each other.

3. The base according to claim 1, wherein:

the base further comprises:

a conductive connection member, wherein the conductive connection member is in the accommodating cavity, and the conductive connection member comprises a first conductive connection portion and a second conductive connection portion that are electrically connected;

wherein the first conductive connection portion is disposed closer to the first connection port than to the second connection port, and the first conductive connection portion is configured to be electrically connected to the terminal of the circuit breaker; and wherein the second conductive connection portion is disposed closer to the second connection port than to the first connection port, and the second conductive connection portion is configured to be electrically connected to the cable terminal.

4. The base according to claim 3, wherein the first conductive connection portion is a U-shaped conductive elastic sheet, a slot is formed between two elastic arms of the U-shaped conductive elastic sheet, and the slot is configured for plugging of the terminal of the circuit breaker when the circuit breaker is connected to the first surface.

5. The base according to claim 4, wherein:

an edge of one end of each of the elastic arms of the U-shaped conductive elastic sheet that surround an opening of the slot has at least one notch, the at least one notch extends toward a bottom wall of the slot to partition each of the elastic arms into a plurality of elastic arm units;

each of the plurality of elastic arm units comprises an abutting portion, wherein the abutting portion is a portion that touches the terminal of the circuit breaker when the terminal of the circuit breaker is plugged into the slot; and distances between abutting portions of the plurality of elastic arm units and the bottom wall of the slot in a depth direction of the slot are different.

6. The base according to claim 3, wherein:

a cable terminal plug-in slot is at a position closer to the second connection port than to the first connection port in the accommodating cavity, and an opening of the cable terminal plug-in slot is opposite to the second connection port;

the second conductive connection portion constitutes one side wall of the cable terminal plug-in slot; and the base further comprises:

an elastic member, wherein the elastic member constitutes another side wall that is of the cable terminal plug-in slot and that is opposite to the second conductive connection portion, the elastic member is configured to apply an elastic pressing force toward the second conductive connection portion to the cable terminal, when the cable terminal is plugged into the cable terminal plug-in slot through the second connection port, to crimp the cable terminal onto the second conductive connection portion.

7. The base according to claim 6, wherein the elastic member is an elastic sheet, the elastic sheet comprises a fixed portion and an elastic arm portion, the fixed portion is fixed relative to the insulating housing, one end of the elastic arm portion is connected to the fixed portion, and another end of the elastic arm portion extends toward the second conductive connection portion and inclines toward a direction away from the second connection port, and the elastic arm portion constitutes the other side wall that is of the cable terminal plug-in slot and that is opposite to the second conductive connection portion.

8. The base according to claim 7, further comprising:

an unlocking device, configured to drive the elastic arm portion to move away from the second conductive connection portion, to release an elastic pressing force applied to the cable terminal.

9. The base according to claim 8, wherein:

the elastic sheet further comprises a connection portion, and one end of the elastic arm portion is connected to the fixed portion by using the connection portion;

the unlocking device comprises a push rod and a first locking structure;

a slide hole is provided at a position that is opposite to the connection portion on a wall plate of the insulating housing in which the second connection port is located, wherein the push rod is configured to slide through slide hole to a first position in the direction toward the connection portion, to press the connection portion to bend in a direction away from the slide hole and drive the elastic arm portion to move away from the second conductive connection portion, and to release the elastic pressing force applied to the cable terminal; and the first locking structure is configured to secure a relative position between the push rod and the slide hole in an axial direction of the slide hole after the push rod slides to the first position.

10. The base according to claim 9, wherein:

the first locking structure comprises a first slider and a first slide groove;

the first slider is provided on a side wall of the push rod;

the first slide groove is provided on an inner wall of the slide hole, the first slide groove comprises a first slide groove section and a second slide groove section, the first slide groove section extends along the axial direction of the slide hole, the second slide groove section extends along a circumferential direction of the slide hole, and one end of the second slide groove section is connected to one end of the first slide groove section that is closer to the connection portion than the other end of the first slide groove section; and the first slider is slidably connected in the first slide groove, and the first slider is configured to slide in the first slide groove section during sliding of the push rod to the first position, wherein when the push rod slides to the first position, the first slider is configured to slide to the end of the first slide groove section that is closer to the connection portion than the other end of the first slide groove section, and wherein after the push rod slides to the first position, the first slider is configured to slide from the first slide groove section into the second slide groove section.

11. The base according to claim 9, wherein one end of the push rod away from the connection portion is outside the insulating housing, a stopper protrusion is on a side wall of the end of the push rod away from the connection portion, the stopper protrusion is spaced from the insulating housing, and wherein the base is configured such that when the push rod slides to the first position in the direction toward the connection portion, the stopper protrusion abuts against an outer surface of the insulating housing.

12. The base according to claim 2, further comprising:
a cover plate, wherein:
    one end of the cover plate is rotatably connected to the end of a side arm portion away from the bottom arm portion, an axis of rotation of the cover plate is parallel to the sliding direction of the insulating housing relative to the mounting rail, and the cover plate is configured to be rotated from a second position to a third position in a direction toward the second mounting slot;
    when the cover plate is in the second position, the cover plate does not cover an opening of the second mounting slot; and
    when the cover plate is in the third position, the cover plate covers the opening of the second mounting slot; and
    a second locking structure provided between the cover plate and the side arm portion, wherein the second locking structure is configured to secure a relative position between the cover plate and the side arm portion when the cover plate is rotated to the third position.

13. The base according to claim 12, wherein:
the second locking structure comprises an elastic snapping arm and a snapping notch;
the elastic snapping arm is provided on the cover plate, and the elastic snapping arm extends along the sliding direction of the insulating housing relative to the mounting rail;
the snapping notch is provided on the side arm portion, and an opening of the snapping notch faces the second mounting slot; and
wherein the base is configured such that when the cover plate is rotated to the third position, the elastic snapping arm is snapped into the snapping notch.

14. The base according to claim 13, wherein the base further comprises:
a third locking structure configured to secure a relative position between the elastic snapping arm and the snapping notch when the cover plate is rotated to the third position.

15. The base according to claim 14, wherein:
the third locking structure comprises a second slide groove, a second slider, a stopper buckle, and a stopper slot;

the second slide groove is on the cover plate, and the second slide groove extends along a direction that is parallel to the cover plate and that is perpendicular to the axis of rotation of the cover plate;

the second slider is slidably connected in the second slide groove, and the second slider is configured to slide from a fourth position to a fifth position along the second slide groove in a direction toward the axis of rotation of the cover plate;

the stopper buckle is on the second slider, and the stopper slot is provided on a bottom surface of the second slide groove; and when the second slider slides from the fourth position to the fifth position, the second slider is configured to drive the stopper buckle to be slidably snapped into the stopper slot, and make the stopper buckle abut against a surface of the elastic snapping arm away from the axis of rotation of the cover plate.

16. The base according to claim 15, wherein:
the second slide groove comprises a third slide groove section and a fourth slide groove section, and the fourth slide groove section is located on a side of the third slide groove section away from the axis of rotation of the cover plate;
wherein the base is configured such that:
    when the second slider is in the fourth position, the second slider is located in the fourth slide groove section, and is not located in the third slide groove section;
    when the second slider is in the fifth position, the second slider is located in the third slide groove section, and is not located in the fourth slide groove section; and
a bottom surface of the third slide groove section is with a first sign, a bottom surface of the fourth slide groove section is provided with a second sign and the first sign is different from the second sign.

17. The base according to claim 3, further comprising:
a temperature measurement module provided in the accommodating cavity, wherein:
    the temperature measurement module comprises a temperature sensor and a wiring socket, the temperature sensor is disposed on the conductive connection member, and the temperature sensor is electrically connected to the wiring socket; and
    the insulating housing is further with a third connection port, the third connection port is in communication with the accommodating cavity, the wiring socket is disposed closer to the third connection port than to other connection ports, and the third connection port is configured to allow a wiring plug to extend into the accommodating cavity to be plugged into the wiring socket; and
a fourth locking structure provided on an outer surface of the insulating housing, wherein the fourth locking structure is configured to secure a relative position between the wiring plug and the wiring socket after the wiring plug is plugged into the wiring socket through the third connection port.

18. The base according to claim 17, wherein:
a boss is provided around a side wall of the wiring plug, wherein the base is configured such that during plugging of the wiring plug into the wiring socket through the third connection port, the boss is configured to extend into the third connection port along with the wiring plug;

the fourth locking structure comprises a slide rail, a third slider, a stopper, a first elastic buckle, and a first elastic slot;

the slide rail is on the outer surface of the insulating housing, and the slide rail extends toward the third connection port;

the third slider is slidably connected to the slide rail, the stopper is provided at one end of the third slider close to the third connection port, the third slider is configured to slide from a sixth position to a seventh position along the slide rail in a direction toward the third connection port to drive the stopper to move from a position not covering the third connection port to a position covering the third connection port;

one of the first elastic buckle and the first elastic slot is on the slide rail, and the other one of the first elastic buckle and the first elastic slot is on the third slider; and when the third slider slides to the seventh position, the first elastic buckle is snapped into the first elastic slot.

19. A circuit breaker with a base, comprising:

a circuit breaker; and a base, comprising:

an insulating housing, wherein:

the insulating housing has a first surface and a second surface that are away from each other, the first surface is configured for a detachable connection of a circuit breaker, and the second surface has a first mounting slot;

the insulating housing is configured to be slidably snapped into a mounting rail in power distribution equipment by using the first mounting slot, an accommodating cavity is provided in the insulating housing, the accommodating cavity is configured to accommodate a conductive connection member, one end of the accommodating cavity is open along a sliding direction of the insulating housing relative to the mounting rail, and another end of the accommodating cavity is closed; and the insulating housing has a first connection port and a second connection port, both the first connection port and the second connection port are in communication with the accommodating cavity, the first connection port is configured to allow a terminal of the circuit breaker to extend into the accommodating cavity when the circuit breaker is connected to the first surface, and the second connection port is configured to allow a cable terminal to extend into the accommodating cavity, wherein the circuit breaker is detachably connected to a first surface of an insulating housing of the base.

20. Power distribution equipment, comprising:

a mounting rail; and a plurality of circuit breakers with bases, wherein each of the bases comprises:

an insulating housing, wherein:

the insulating housing has a first surface and a second surface that are away from each other, the first surface is configured for a detachable connection of a circuit breaker, and the second surface has a first mounting slot;

the insulating housing is configured to be slidably snapped into a mounting rail in the power distribution equipment by using the first mounting slot, an accommodating cavity is provided in the insulating housing, the accommodating cavity is configured to accommodate a conductive connection member, one end of the accommodating cavity is open along a sliding direction of the insulating housing relative to the mounting rail, and another end of the accommodating cavity is closed;

the bases of the circuit breakers are configured to be slidably snapped onto the mounting rail by using a first mounting slot; and the insulating housing comprises a bottom arm portion and two side arm portions, one end of each of the two side arm portions is connected to either end of the bottom arm portion along a first direction, and another end of each of the two side arm portions extends towards a same side of the bottom arm portion along a second direction;

the bottom arm portion and the two side arm portions enclose a second mounting slot, and the second mounting slot is configured for snap-fitting of the circuit breaker:

an inner surface of the second mounting slot and surfaces of the side arm portions away from the bottom arm portion form the first surface of the insulating housing, and a surface of the bottom arm portion away from the second mounting slot forms the second surface; and the sliding direction of the insulating housing relative to the mounting rail, the first direction, and the second direction are perpendicular to each other.

* * * * *